US010295656B1

(12) United States Patent
Li et al.

(10) Patent No.: US 10,295,656 B1
(45) Date of Patent: May 21, 2019

(54) LIDAR SYSTEMS AND METHODS

(71) Applicant: Hesai Photonics Technology Co., Ltd, Shanghai (CN)

(72) Inventors: Jiasheng Li, Shanghai (CN); Hongguang Wang, Shanghai (CN); Shaoqing Xiang, Shanghai (CN)

(73) Assignee: HESAI PHOTONICS TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/170,783

(22) Filed: Oct. 25, 2018

Related U.S. Application Data

(63) Continuation of application No. PCT/CN2018/108409, filed on Sep. 28, 2018.

(30) Foreign Application Priority Data

| Jun. 13, 2018 | (CN) | 2018 1 0606927 |
| Jun. 13, 2018 | (CN) | 2018 1 0607571 |
| Jun. 13, 2018 | (CN) | 2018 2 0914524 U |

(51) Int. Cl.
*G01C 3/08* (2006.01)
*G01S 7/481* (2006.01)

(52) U.S. Cl.
CPC .......... *G01S 7/4818* (2013.01); *G01S 7/4813* (2013.01); *G01S 7/4815* (2013.01)

(58) Field of Classification Search
CPC ..... G01S 7/4818; G01S 7/4813; G01S 7/4815
(Continued)

(56) References Cited

U.S. PATENT DOCUMENTS 7,978,312 B2 * 7/2011 Scott .................. G01S 17/89
356/3.01
9,069,061 B1 6/2015 Harwit et al.
(Continued)

FOREIGN PATENT DOCUMENTS

| CN | 106093911 A | 11/2016 |
| CN | 106154281 A | 11/2016 |
| CN | 107271983 A | 10/2017 |

OTHER PUBLICATIONS

Co-pending U.S. Appl. No. 16/123,706, filed Sep. 6, 2018.
PCT/CN2018/086768 International Search Report and Written Opinion dated Jan. 2, 2019.

*Primary Examiner* — Mark Hellner
(74) *Attorney, Agent, or Firm* — Wilson Sonsini Goodrich & Rosati

(57) ABSTRACT

A Lidar system is provided. The Lidar system may comprise: a plurality of light sources configured to emit a plurality of light beams, the plurality of light sources are mounted to a first mounting apparatus comprising a cooling feature; a plurality of optical fiber elements, and each of the plurality of light sources is optically coupled to an input end of one or more optical fiber elements from the plurality of optical fiber elements; and a second mounting apparatus comprising at least one mounting unit coupled to an emitting end of the plurality of optical fiber elements, and the at least one mounting unit is configured to control an output direction of the plurality of light beams individually, and a distribution pattern of the plurality of light beams emitted from the emitting end of the plurality of optical fiber elements.

22 Claims, 17 Drawing Sheets

(58) Field of Classification Search
USPC .......................................................... 356/5.01
See application file for complete search history.

(56) References Cited

U.S. PATENT DOCUMENTS

| | | |
|---|---|---|
| 9,772,399 B2 | 9/2017 | Schwarz et al. |
| 10,003,168 B1 | 6/2018 | Villeneuve |
| 2011/0216304 A1 | 9/2011 | Hall et al. |
| 2017/0153319 A1 | 6/2017 | Villeneuve et al. |
| 2017/0155225 A1* | 6/2017 | Villeneuve .............. G01S 17/00 |
| 2018/0003805 A1 | 1/2018 | Popovich et al. |
| 2018/0164408 A1* | 6/2018 | Hall ........................ G01S 17/10 |
| 2018/0275251 A1* | 9/2018 | Choi ..................... G01S 7/4817 |

\* cited by examiner

LIDAR SYSTEMS AND METHODS

CROSS-REFERENCE

This application is a Continuation Application of International PCT Application No. PCT/CN2018/108409, filed on Sep. 28, 2018, which claims the benefit of Chinese Application No. 201810607571.X, filed on Jun. 13, 2018, Chinese Application No. 201820914524.5, filed on Jun. 13, 2018, and Chinese Application No. 201810606927.8, filed on Jun. 13, 2018, each of which is entirely incorporated herein by reference.

BACKGROUND OF THE INVENTION

Lidar technology can be used to obtain three-dimensional information of an environment by measuring distances to objects. A Lidar system may include at least a light source configured to emit a pulse of light and a detector configured to receive returned pulse of light. The returned pulse of light or light beam may be referred to as echo light beam. Based on the lapse time between the emission of the pulse of light and detection of returned pulse of light (i.e., time of flight), a distance can be obtained. The pulse of light can be generated by a laser emitter then focused through a lens or lens assembly. The returned pulse of light may be received by a detector located near the laser emitter. In some Lidar systems, such a pair of laser emitter and detector may be configured to rotate about a rotational axis thus scanning across a plane.

In some situations, in order to obtain sufficient three-dimensional information, multiple emitter/detector pairs may be employed. Such Lidar may also be referred to as multiline Lidar. A multiline Lidar may provide benefits of achieving a large field of view or greater resolution. A large area scan can be achieved by rotating Lidar and thereby rotating the vertical field of view with the Lidar. In some cases, the multiple emitter/detector pairs may be arranged into arrays. The number and/or distribution of emitters arranged in a vertical direction (e.g., with respect to ground level) may substantially affect the angular resolution or angle range in the vertical field of view. For example, the vertical angular resolutions of 16-line, 32-line, and 64-line Lidars are 2°, 1.33°, and 0.43° respectively. In another example, the vertical angular resolutions of 4-line and 8-line Lidars are each 0.8°. The angular resolution or angle range may be limited by the spatial configuration of the emitters. For instance, as more laser lines are needed to achieve a higher vertical resolution, the overall Lidar system may have to increase the size to accommodate more laser emitters. In some cases, multiple emitters or lasers may be located at the focal plane of an optical assembly or optical lens which requires the emitters or lasers packed into a confined region of area. Such crowded or dense arrangement of the lasers may prevent excess heat generated by the lasers from being removed or dissipated from the Lidar system resulting in poor reliability of the Lidar system.

SUMMARY OF THE INVENTION

A need exists for improved Lidar system for three-dimensional measurement. A further need exists for a multiline Lidar with improved spatial resolution or greater field of view without increasing the size of the overall system. The provided Lidar system may address the above needs by providing a flexible and spatially configurable emitting device of the Lidar system. The provided Lidar may exhibit improved performance and better device reliability with improved heat dissipation capability. In particular, lasers or light sources may be permitted to be arranged into an optimal layout for facilitating heat dissipation without affecting the emitting light beam distribution or resolution. Three-dimensional imaging may be achieved by the provided Lidar system with improved accuracy and better performance.

In some aspects, a Lidar system is provided. The Lidar system may comprise: a plurality of light sources configured to emit a plurality of light beams, the plurality of light sources are mounted to a first mounting apparatus comprising a cooling feature; a plurality of optical fiber elements, and each of the plurality of light sources is optically coupled to an input end of one or more optical fiber elements from the plurality of optical fiber elements; and a second mounting apparatus comprising at least one mounting unit coupled to an emitting end of the plurality of optical fiber elements, and the at least one mounting unit is configured to control an output direction of the plurality of light beams individually, and a distribution pattern of the plurality of light beams emitted from the emitting end of the plurality of optical fiber elements.

In some embodiments, the plurality of light sources, the plurality of optical fiber elements, the first mounting apparatus and the second mounting apparatus are configured to rotate about a vertical axis. In some embodiments, the plurality of light sources, the plurality of optical fiber elements or the second mounting apparatus is disposed on a supporting body connected to a rotor of the Lidar system.

In some embodiments, the first mounting apparatus comprises a material having high thermal conductivity. In some embodiments, the cooling feature includes a plurality of heat sinks in direct contact with the plurality of light sources. In some embodiments, the cooling feature includes a plurality of blade features to facilitate air circulation inside the Lidar system. In some embodiments, an arrangement of the plurality of light sources mounted to the first mounting apparatus has gaps among the plurality of light sources so as to facilitate heat dissipation. In some cases, the distribution pattern of the plurality of light beams emitted from the emitting end of the plurality of optical fiber elements is independent of the arrangement.

In some embodiments, each of the plurality of light sources is optically coupled to one or more optical fiber elements using an optical coupling element. In some embodiments, at least one of the plurality of light sources is optically coupled to two or more optical fiber elements using an optical coupling element. In some cases, the two or more optical fiber elements have different optical properties.

In some embodiments, the at least one mounting unit is mechanically connected to a rotor of the Lidar system with a pre-determined orientation. In some embodiments, the at least one mounting unit comprises a set of slots arranged along a length direction of the mounting unit. In some examples, the set of slots are located on two opposing sides of the at least one mounting unit. In some cases, a subset of slots is selected from the set of slots for receiving the plurality of optical fiber elements by the emitting end. In some cases, each of the set of slots has a pre-determined tilt angle with respect to a horizontal direction. In some cases, the output direction of the plurality of light beams is individually controlled by selecting a given slot with a pre-determined tilt angle from the set of slots. In some cases, the set of slots are non-uniformly along the length direction of the mounting unit.

In some embodiments, the second mounting apparatus comprises multiple mounting units arranged in a horizontal plane with pre-determined orientations, and wherein each mounting unit comprises a set of slots arranged along a length direction of the mounting unit. In some cases, distribution pattern of the plurality of light beams emitted from the emitting end of the plurality of optical fiber elements is controlled by a selection of a subset of slots from the set of slots and/or a selection of one or more mounting units from the multiple mounting units.

In some embodiments, the plurality of light beams emitted from the emitting end of the plurality of optical fiber elements are directed to an optical element to collimate the plurality of light beams into collimated light beams to propagate in different directions. In some embodiments, the Lidar system further composes a receiving device to receive echo light beams and wherein the receiving device is disposed on a rotor of the Lidar system. In some embodiments, the Lidar system further comprises a wireless transmission module configured to provide electrical energy to the Lidar system Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
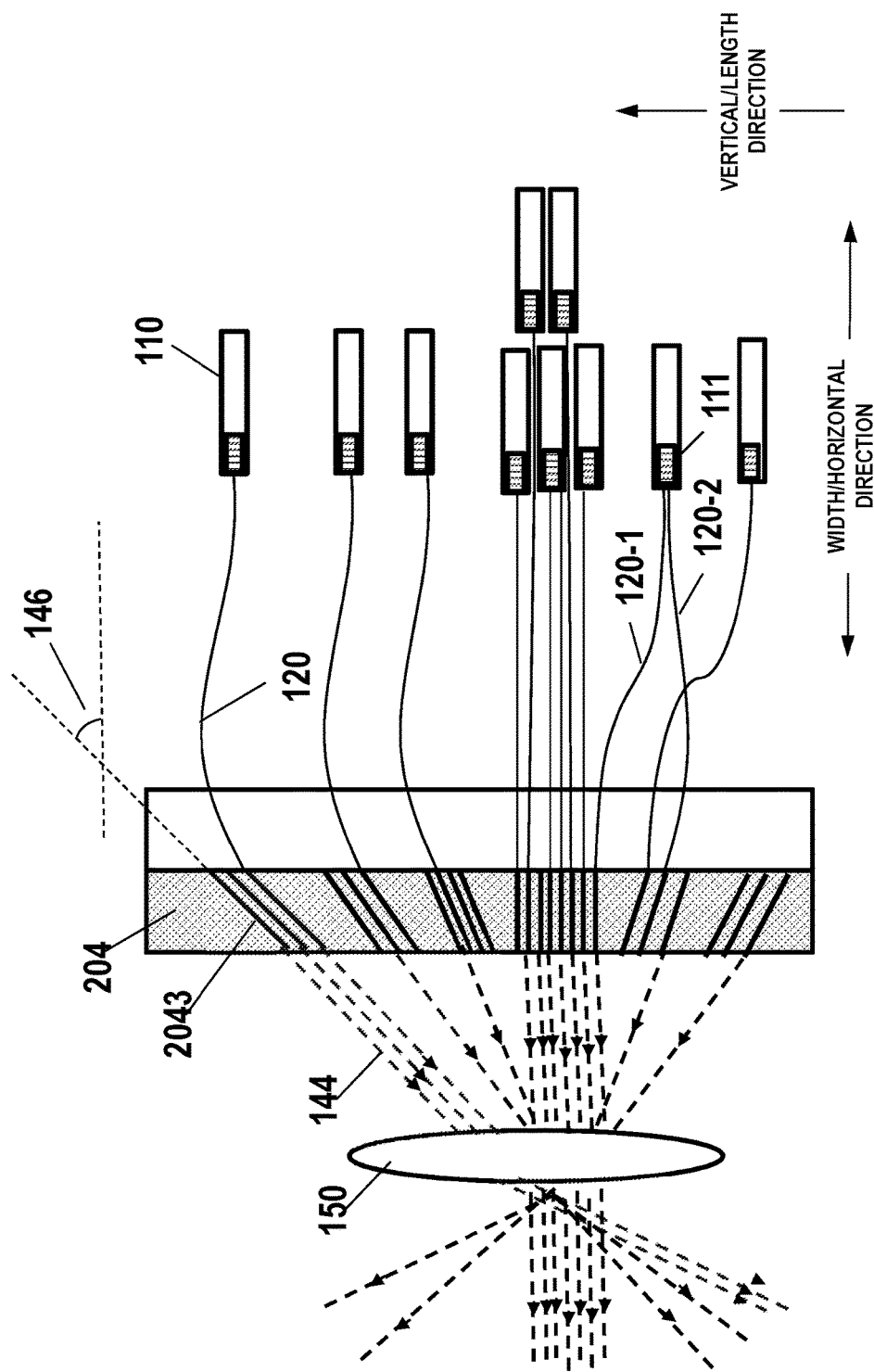
FIG. 1 schematically shows a mounting unit for arranging a plurality of optical fiber elements 120 into pre-determined directions, in accordance with some embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time of electromagnetic waves between a source and a target.

Multiline Lidar has been increasingly used in research and commercial applications. In a multiline Lidar system, a plurality of lasers and corresponding detectors are arranged in a vertical direction to increase the detection range in the vertical direction. In a conventional multiline Lidar system, spatial configuration or arrangement of the laser emitters may significantly restrict the resolution or field of view. The provided Lidar systems and methods may resolve the space restriction by employing optical fibers and a mounting structure for controlling the direction of light beams in a flexible and/or configurable manner.

In some embodiments, when a Lidar system is not rotating, the emitting apparatus of the Lidar system may emit laser beams which project into the environment to scan a line (e.g., a vertical line scan). Along this line scan, in some instances, a plurality of laser beam spots may be non-uniformly distributed (e.g., preferred to be denser in the middle of the line scan). The spacing between the laser beams spots along the line scan may determine the angular resolution of the Lidar. When the Lidar system rotates, the line scan may turn into a surface scan as a vertical area is scanned by the laser beams. In some cases, the angular range of the line scan or of the surface scan in the vertical plane may determine the vertical field-of-view of the Lidar system, and the angular range of the surface scan in the horizontal plane may determine the horizontal field-of-view of the Lidar system. Correspondingly, the distribution of light beams along the vertical line may determine the resolution of the Lidar system in the vertical field-of-view, and the rotation speed of the Lidar may determine the resolution of the Lidar system in the horizontal field-of-view.

In some embodiments, Lidar system of the present disclosure may comprise at least an emitting apparatus and a receiving apparatus. In some embodiments, the emitting apparatus may comprise a plurality of light sources configured to emit a plurality of light beams, a plurality of optical fiber elements optically coupled to the plurality of light sources at an input end, and coupled to a mounting unit at an output end. The mounting unit may be configured to position a light emitting end of the optical fiber elements into an angle thereby affecting an output direction of the plurality of light beams. In some cases, the mounting unit may comprise one or more components or sub-mounting unit. In some embodiments, each sub-mounting unit may comprise a set of slots configured to receive an emitting end of optical fiber elements.

As utilized herein, terms "light emitting end", "output end" or "emission end" and the like are used interchangeably throughout the specification unless context suggests otherwise. The terms can refer to the end of the optical fiber where light is emitted out. The terms "light input end" and "input end" are used interchangeably throughout the specification unless context suggests otherwise.

FIG. 1 schematically shows a mounting unit 204 for arranging a plurality of optical fiber elements 120 into pre-determined directions 146, in accordance with some embodiments of the invention. In some embodiments, a set of optical fiber elements 120 may be optically coupled to a set of light sources 110 at one end (e.g., input end). A plurality of light beams 144 may be emitted out of the plurality of optical fiber elements from a light emission end or output end. The output directions 146 of the plurality of output light beams may be controlled or determined by the mounting unit 204. The mounting unit 204 may comprise a set of slots 2043 configured to receive the light emission end of the optical fiber elements 120 such that the directions or distributions of the output light beams can be configured or controlled by the mounting unit.

In preferred embodiments, the plurality of slots may be configured for receiving the light emission ends of the plurality of optical fiber elements. The plurality of slots may be designed to have pre-determined directions and distributions thereby controlling the directions and/or distributions of light beams output from the light emission end of the optical fiber elements. In some cases, the plurality of slots may be arranged into an array along the length of the mounting unit. In some cases, the plurality of slots may have a longitudinal direction which may be orientated at various angles with respect to the width direction of the mounting unit such that the output direction of light beams can be controlled individually. The light emission end of an optical fiber element may be guided by a corresponding slot thereby affecting a direction of the output light beam.

In some cases, the mounting unit 204 may be orientated relative to the ground reference frame such that the width direction of the mounting unit is parallel to the horizontal direction and the length direction of the mounting unit is parallel to the vertical direction. In such cases, the output directions of the light beams may be described with an angle with respect to the horizontal direction. It should be understood that "vertical" and "horizontal" are relative terms that are intended to provide an example of orientations of the slots/mounting units in one application. For example, when the Lidar system is provided on a movable object to sense an environment surrounding the movable object, the horizontal direction or vertical direction may be relative to the body frame of the movable object. It should be appreciated that the directions of the output light beams can be controlled with respect to any other directions depending on the orientation of the mounting unit.

In some cases, one slot may be configured to receive one optical fiber element. The total number of slots may be greater than or equal to the total number of optical fiber elements. Alternatively, the total number of slots may be less than the total number of optical fiber elements. In some cases, it is preferable to provide more slots than the optical fiber elements such that a subset of slots may be selected from the plurality of slots to achieve variable beam distributions. For instance, based on specific applications, the region in the field of view where denser light beams distributions is desired may be different. The light beam distribution and/or directions may be controlled by selecting varied subset of slots from the plurality of slots. Different subsets of slots may have different controlled directions and densities. This provides benefit to allow for a Lidar system with flexibility and configurability to accommodate different and complex angular resolution requirement or range of angle. In some instances, in a sparse region, fewer slots may be selected for connecting optical fiber elements thereby improving energy efficiency or lowering energy consumption of the Lidar system. In some instances, based on different requirements for range of angle, slots with greater degree of angle with respect to a horizontal direction (e.g., slots located away from the centerline or middle region) may be selected to achieve a wider vertical field of view.

An optical fiber element 120 may be fixedly connected to a slot selected from the plurality of slots 2043. In some instances, the optical fiber element may be rigidly fixed to the mounting unit at the light emission end such that the light emission end of the optical fiber element may not be permitted to move relative to the mounting unit 204. In some instances, the optical fiber element may be rotatably fixed by the mounting unit at the light emission end such that the light emission end of the optical fiber element may be allowed to rotate about a fiber axis at the output end which may be guided by the corresponding slot.

An optical fiber may be an optical-waveguide device which can be any device that provides a constrained guided optical path in a solid, for example, an optical fiber having one or more waveguide cores or an optical slab or monolithic substrate having a width and length each larger than the thickness, and having one or more waveguides formed therein (e.g., laterally spaced waveguides formed by diffusion of an index-modifying material through a mask to form surface or near-surface waveguides). An optical fiber can be any device having one or more cores or internal waveguides and a length much longer than a transverse width, for example a glass fiber drawn from a melt or preform or extruded from an extruder. A thin optical fiber may be a fiber that is thin enough to be readily bent to some non-infinite radius (e.g., a conventional optical fiber). An optical ribbon is defined as a fiber having two or more signal cores laterally spaced across a width of the fiber. In some cases, an optical fiber element is selected to be deformable or flexible such that the spatial configuration of the plurality of light sources is decoupled or dissociated from the spatial configuration of the set of slots or the emission end. For instance, the optical fiber elements may be bendable such that the plurality of light sources may be located at any suitable location in the Lidar system with respect to the mounting unit or the emission end. As utilized herein, the terms "optical fiber" and "optical fiber element" are interchangeable throughout this specification unless context suggests otherwise.

The plurality of optical fiber elements can be any suitable type of fiber such as, single-mode (SM) fiber, multi-mode (MM) fiber, large-mode-area (LMA) fiber, polarization-maintaining (PM) fiber, photonic-crystal or photonic-bandgap fiber, gain fiber (e.g., rare-earth-doped optical fiber for use in an optical amplifier), or any suitable combination thereof. In some cases, the plurality of optical fiber elements may be the same type of optical fiber such as a multi-mode fiber. Light beams output from the plurality of optical fiber elements may be the same in terms of beam quality, power, wavelength, and various other aspects. Alternatively, light beams output from the plurality of optical fiber elements may be different. For example, the optical coupling element for coupling light generated by the light source (e.g., laser) into the optical fibers may be used to control various properties of the light beams. Details about the coupling element are discussed later herein.

In some cases, the plurality of optical fiber elements may be selected to have different properties or parameters such as numerical aperture (NA), coupling capability, end surface and various others. Different properties or parameters of the optical fiber elements may be selected to affect one or more beam parameters (e.g., beam size, divergence, focusing, or numerical aperture (NA)).

In some cases, different optical fibers may be selected according to a scanning region or field of view. For example, in the vertical direction of an environment surrounding an automobile application, the emitted light beams may be desired to be dense in the middle region and sparse in the upper and lower regions. Light beams emitted by the lasers may pass through one or more optical components such as optical collimation devices respectively and then irradiate on an external object, for example, a ground, a pedestrian, a bicycle, a bus stop board, or an automobile. As the Lidar rotates (rotate back and forth about one or more axes within an angular range or revolute about an axis), the vertical line of non-uniformly distributed beams may scan a vertical area ahead, where the middle region of the vertical area may have denser light beams for detection and thus has increased detection accuracy. Since the remote object is usually at the same horizontal level as the Lidar, the external object may be more likely to be detected by light beams in the middle region, and may require more accurate detection and longer distance range. In this case, optical fiber elements corresponding to the light beams emitted into the middle region (i.e., long distance range) may have a higher NA for higher light beam power, so as to detect a longer distance range. In some cases, the optical fiber elements corresponding to the light beams emitted into the lower region such as directed to the ground (i.e., short distance range) may have a lower NA for lower light beam power. In some cases, the NA of the optical fiber elements may be in a range determined by the core diameter of the optical fiber which can be, for example, from 100 micron to 200 micron.

In some cases, the plurality of optical fiber elements 120 may have different output end surfaces. The output end surface of the optical fiber elements may affect the direction of an output light beam. In some cases, an angle of the end surface with respect to the fiber axis at the output end may affect the direction of output light beam. In this case, the direction of output light beam may be controlled by alternating the angle of the end surface, the configuration of the slots or a combination of both.

In some embodiments, the plurality of output light beams 144 may pass through one or more optical elements such as a lens or lens assembly (e.g., one or more spherical lenses or aspheric lenses) 150 for collimation, divergence, expansion, convergence or various other effects.

In some embodiments, the plurality of slots may be grouped into a plurality of groups. Each group may comprise a subset of consecutive slots. In some cases, the subset of slots within a group may be parallel with each other. Alternatively, the subset of slots within a group may not be in parallel with each other. The subset of slots within a group may or may not be evenly spaced. The plurality of groups may or may not be evenly spaced or uniformly distributed or the spacing between adjacent groups may or may not be constant. The plurality of slots can be grouped into any number of groups such as at least 1, 2, 3, 4, 5, 6, 7, 8, 9, 10, 15 or more groups.

The number of slots in each group may or may not be the same. For instance, there may be more slots in the group which may be close to the middle portion, than the slots in the upper group 145-1 or lower group. Each group may comprise any number of slots. For example, at least 1, 2, 3, 4, 5, 6, 7, 8, 9, 10, 15, 20, 25, 30 or more slots may be grouped into a group. The spacing between adjacent slots across different groups may or may not be the same. For instance, spacing in the group close to the middle portion may be smaller than the spacing in the upper group or lower group.

In some embodiments, slots in different groups may have different angles 146 with respect to the width direction of the mounting unit. For example, as shown in FIG. 1, the uppermost group may have an angle greater than the angle of the middle group. The angle with respect to a fiber axis at the output end can be in any suitable range, such as, in any range from $-60°$ to $60°$, or in any other range. The difference in angles of adjacent groups may be, for example, no more than $0.1°$, $0.2°$, $0.3°$, $0.4°$, $0.5°$, $0.6°$, $0.7°$, $0.8°$, $0.9°$, $1°$, $2°$, $5°$, $10°$, $15°$ or any number greater than $15°$. In some instances, the degree of angle may increase from the middle group to and off-center group. In some instances, the incremental step of angles from a middle group to an off-center group (may not be constant number. The incremental step can be, for example, no more than $0.1°$, $0.2°$, $0.3°$, $0.4°$, $0.5°$, $0.6°$, $0.7°$, $0.8°$, $0.9°$, $1°$, $2°$, $5°$, $10°$, $15°$ or any number greater than $15°$. The angles of slots/groups can be precisely controlled such that the directions of output light beams can be controlled with improved precision and accuracy. The angle with respect to the fiber axis with respect to the length direction of the mounting unit may also be referred to as a tilt angle throughout the specification. In some cases, the tilt angle can also be defined with respect to the width direction of the mounting unit (e.g., horizontal direction).

The distribution of the plurality of groups or the distribution of slots within each group need not be symmetrical about the centerline or middle line of the mounting unit. In some cases, the distribution of the slots and the angles of the slots may be determined according to a desired vertical angular resolution, range of the vertical field of view, desired angular resolution in a given region and various others. Additionally or alternatively, the density of slots within each group may be substantially the same across different groups whereas the angular resolution or distribution of light beams may be controlled by selecting more or less slots from each group. The spacing (e.g., center to center) between adjacent slots may be at least 1, 1.1, 1.2, 1.3, 1.4, 1.5, 1.6, 1.7, 1.8, 1.9, 2 times or more of the width of the slot. In some cases, the spacing between adjacent slots may be dependent on the dimension of the optical fibers such that two adjacent optical fibers may be spaced apart by no more than 0.05 mm, 0.1 mm, 0.2 mm, 0.3 mm, 0.4 mm, 0.5 mm, 0.6 mm, 0.7 mm, 0.8 mm, 0.9 mm, 1 mm, 2 mm or any number greater than 2 mm. The compact arrangement of slots may allow for more light beams fit within an area or region thereby improving the resolution without increasing the overall size of the Lidar system.

For example, in the vertical direction, the lasers and corresponding laser beams or laser lines may be distributed densely in the middle part of the device, and may be distributed sparsely in the upper and lower parts. In another example, a 40-line in-vehicle Lidar may have a vertical field of view range of −25° to +15° corresponding to a span of the emitted beams from the vertically lowest laser to the highest laser, with the horizontal level being 0°. In the vertical field of view range of −6° to +2°, the Lidar may have a vertical angular resolution of ⅓° corresponding to a first concentration of laser beams. In the vertical field of view range of +2° to +3°, −14° to −6°, the Lidar may have a vertical angular resolution of 1° corresponding to a second concentration of laser beams. In the vertical field of view range of +3° to +5°, the Lidar may have a vertical angular resolution of 2° corresponding to a third concentration of laser beams. In the vertical field of view range of +5° to +11°, the Lidar may have a vertical angular resolution of 3° corresponding to a fourth concentration of laser beams. In the vertical field of view range of +11° to +15°, the Lidar may have a vertical angular resolution of 4° corresponding to a fifth concentration of laser beams. In the vertical field of view range of −19° to −14°, the Lidar may have a vertical angular resolution of 5° corresponding to a sixth concentration of laser beams. In the vertical field of view range of −25° to −19°, the Lidar may have a vertical angular resolution of 6° corresponding to a seventh concentration of laser beams. Accordingly, the slots located in the middle group may be denser than the slots located at the top or bottom of the mounting unit. Alternatively or additionally, denser light beams in the middle region may be achieved by selecting more slots located in the middle group to be coupled to optical fibers.

The plurality of optical fiber elements 120 may be optically coupled to a set of light sources 110. The plurality of light sources 110 may be configured to generate laser beams or pulses of light. In some embodiments, the wavelength of the laser beam may be between 895 nm and 915 nm (e.g., 905 nm). This wavelength range may correspond to infrared light which are invisible and penetrative, which can improve the detection range of the Lidar and prevent disturbance to the environment. The wavelength of the laser beam can be in any other range depending on the specific application. In some cases, a light source may comprise at least a laser diode and a driver circuit.

The number of light sources may be equal to or less than the number of optical fibers. Alternatively, the number of light sources may be greater than the number of optical fibers. Each light source may be coupled to one or more optical fibers. In some cases, a light source may be coupled to one or more optical fibers via an optical coupling element 111.

An optical coupling element in some cases may be a demultiplexer which may include a 1×N fiber-optic power splitter with one fiber-optic input port and N fiber-optic output ports. As an example, an optical-power splitter may include one or more fused biconical taper (FBT) splitters which are assembled by placing two or more fibers adjacent to one another and then fusing the fibers together by applying heat. As another example, an optical-power splitter may include a planar lightwave circuit made by fabricating optical waveguides on a glass substrate using a lithographic process. Alternatively, the coupling element may not need to comprise a fiber-optic power splitter when a light source may be coupled to single optical fiber element.

Alternatively, in some cases, an optical coupling element may be a cylindrical lens. As an example, the light source may be a laser diode, and a cylindrical lens may be arranged at a proper distance from the emitting surface of the laser diode to compress the divergent angle of the laser diode. An input end of one optical fiber may be arranged at the focal plane of the cylindrical lens to couple the light beam of the laser diode into the optical fiber. In some cases, the input ends of two or more optical fibers may be arranged at the focal plane of the cylindrical lens to couple and split the light beam of the laser diode into the two or more optical fibers. The fraction of light coupled to each optical fiber may be determined by the properties or parameters of the two or more optical fibers (e.g., NA), and by the arranged positions of the input ends of the two or more optical fibers corresponding to the emitting surface of the laser diode.

A light source may be coupled to any number of optical fiber elements. A light source may, in some cases, be coupled to multiple optical fiber elements (e.g., optical fiber elements 120-1, 120-2). The multiple optical fiber elements coupled to the same light source may or may not have the same properties or parameters. In some cases, different properties of the optical fiber element may be selected based on beam quality requirement, detection range requirement, energy efficiency requirement and various others. In an example, optical fiber elements (e.g., optical fiber element 120-1) corresponding to the light beams emitted into the middle region may have a higher NA for higher light beam power and longer distance range. In some cases, the optical fiber elements (e.g., optical fiber element 120-2) corresponding to the light beams emitted into the lower or higher region such as directed to the ground or to the sky may have a lower NA.

In some cases, the multiple optical fiber elements coupled to the same light source can be the same (e.g., same NA, same operating mode, etc) where the optical coupling unit may be used to control the fraction of light coupled to each optical fiber element. For example, the fraction of light coupled to the optical fiber element corresponding to light beam emitted to a long range may be greater than the fraction of light coupled to the optical fiber element corresponding to a short range. In the illustrated example, the fraction of light coupled to optical fiber element 120-1 may be greater than the fraction of light coupled to optical fiber element 120-2.

The set of slots 2043 may be integrally formed with the mounting unit 204. For instance, the slots such as grooves or channels may be fabricated (e.g., etched, molded, cut, engraved, etc) with the mounting unit. The mounting unit 204 may be composed of any suitable material. In some embodiments, the material may be selected to have a relatively low coefficient of thermal expansion. For example, the mounting unit 130 may be made from a material having a coefficient of thermal expansion of less than $4\times10^{-6}$ $K^{-1}$, such as for example, a glass material, a lithium-aluminosilicate glass-ceramic, Invar, or a silicon-based material. Having a relatively low coefficient of thermal expansion may allow the optical fiber elements mounted to the mounting unit to maintain optical alignment in the presence of environmental temperature variations.

The aforementioned mounting unit may allow for controlling the light beam distribution in a flexible or configurable manner. In some cases, the light beams may be controlled by the mounting unit to achieve an effect that would otherwise be achieved by an optical element. For instance, light beams may be controlled to be focused on a desired plane (e.g., focal plane of a lens 150) or collimated by the mounting unit. In such cases, the optical element (e.g., collimator) used in a conventional Lidar system may be eliminated. A subset of slots within a group may not be parallel with each other. Other variations may be provided to achieve various effects so as to improve the performance of the Lidar system or remove the necessity of certain optical components utilized in a conventional Lidar system The mounting unit may have any suitable shape, dimension or geometrics. For instance, the mounting unit may have a substantially rectangular shape, oval shape, circular shape, ring shape, arc shape, triangular shape, trapezoid, square shape, or any other shape. As mentioned above, the array of slots may or may not have the same length so long as the output end of the optical fibers can be affixed or connected to the mounting unit. The end surfaces of the slots may or may not be aligned along a vertical direction.

A slot may have any suitable cross-sectional shape or dimensions. The cross-section of the slot may have, for example, a circular shape, half-circle shape, arc shape, triangular shape, V shape, D shape, C shape, W shape, O shape, rectangular shape, square shape, and various others. The slot may have a dimension to accommodate at least a portion of an optical fiber or the output end of the optical fiber circumferentially as long as the direction of the optical fiber can be guided by the slot. In some cases, the slot may have a width or width of the opening that is greater than or equal to the diameter of the output end of the optical fiber. Alternatively, the width is smaller than the diameter of the optical fiber. The width of the slot may be, for example, no more than 0.05 mm, 0.1 mm, 0.2 mm, 0.3 mm, 0.4 mm, 0.5 mm, 0.6 mm, 0.7 mm, 0.8 mm, 0.9 mm, 1 mm, 2 mm or any number greater than 2 mm. The cross-section of a slot may be constant. Alternatively, the cross-section of a slot may be variable. For instance, when the cross-section of an optical fiber may be variable, the slot may be designed to accommodate the variable cross-section of the optical fiber.

Figure 2:
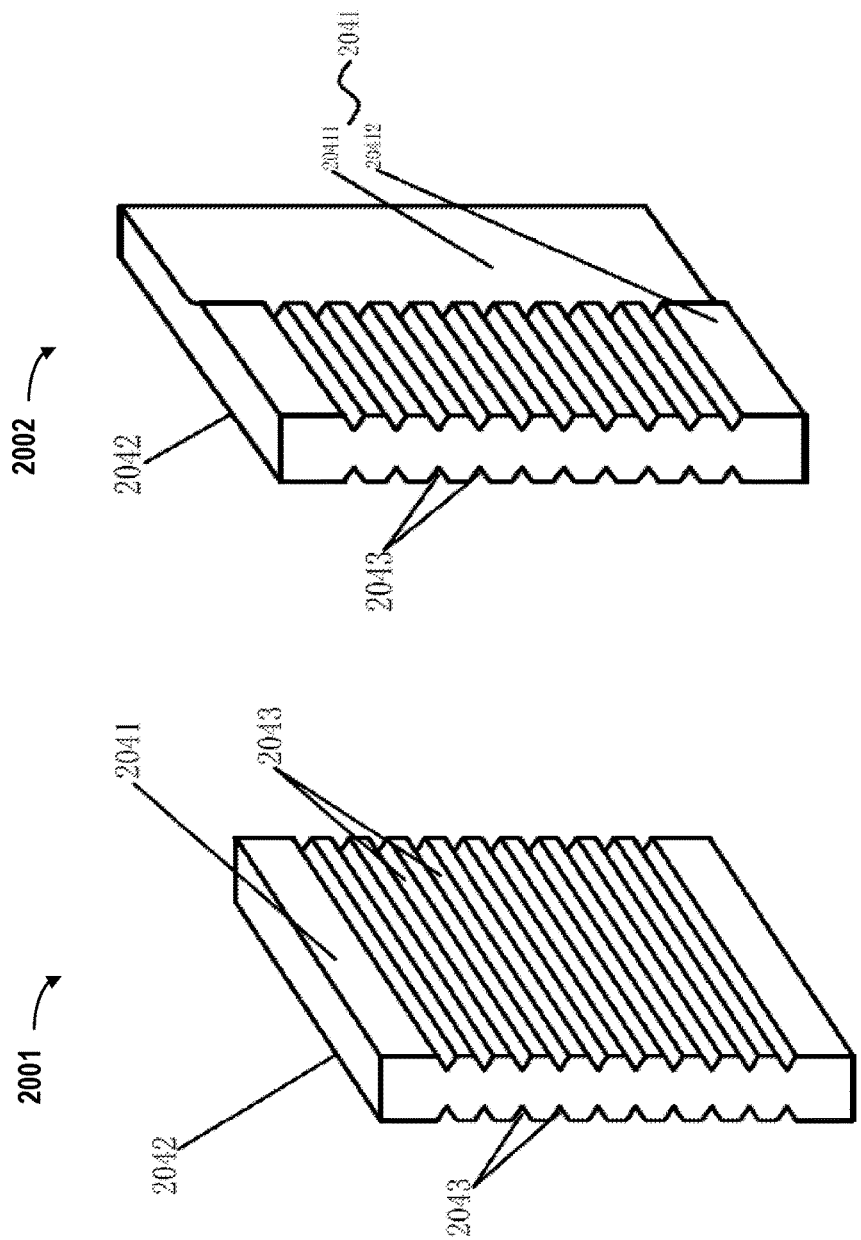
FIGS. 2-4 show examples of mounting units with slots having V-shaped cross-section, in accordance with some embodiments of the invention.
Figure 3:
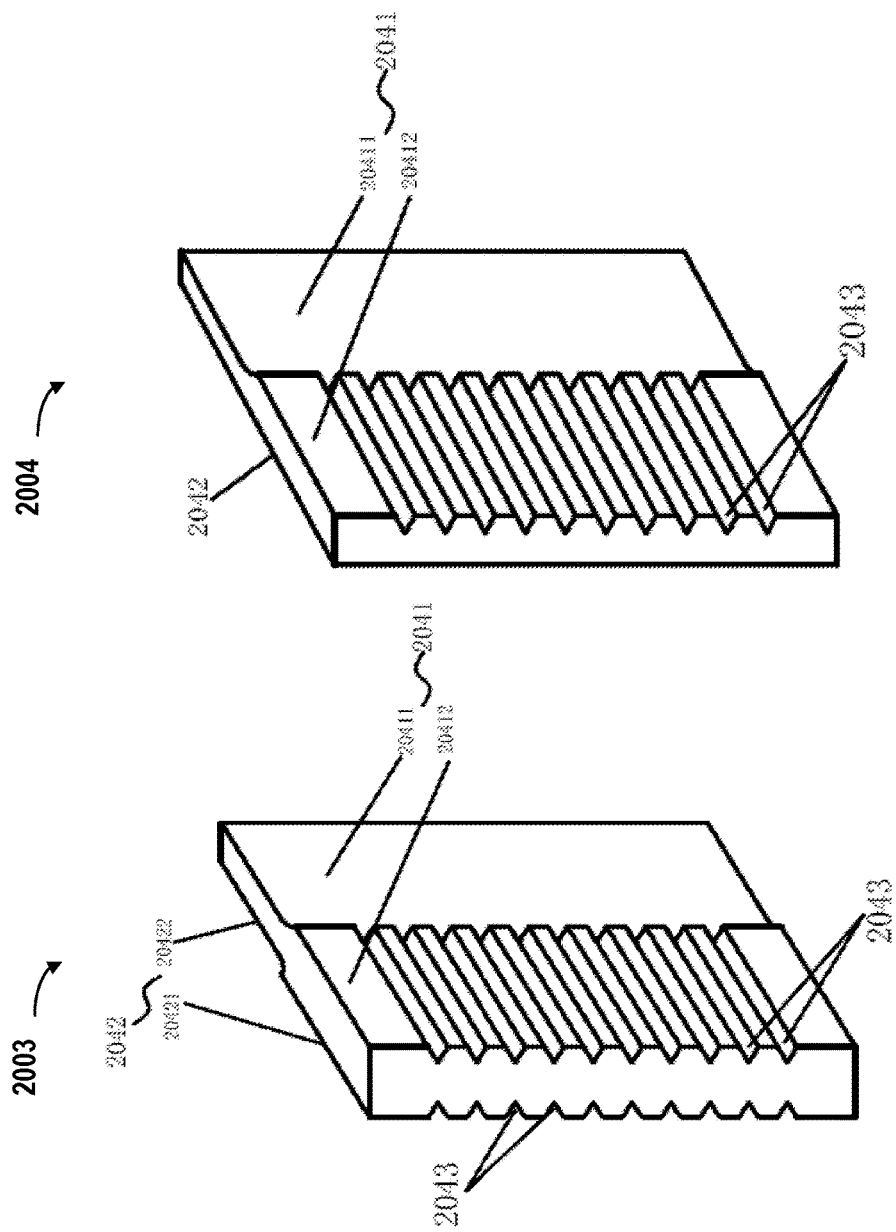
Figure 4:
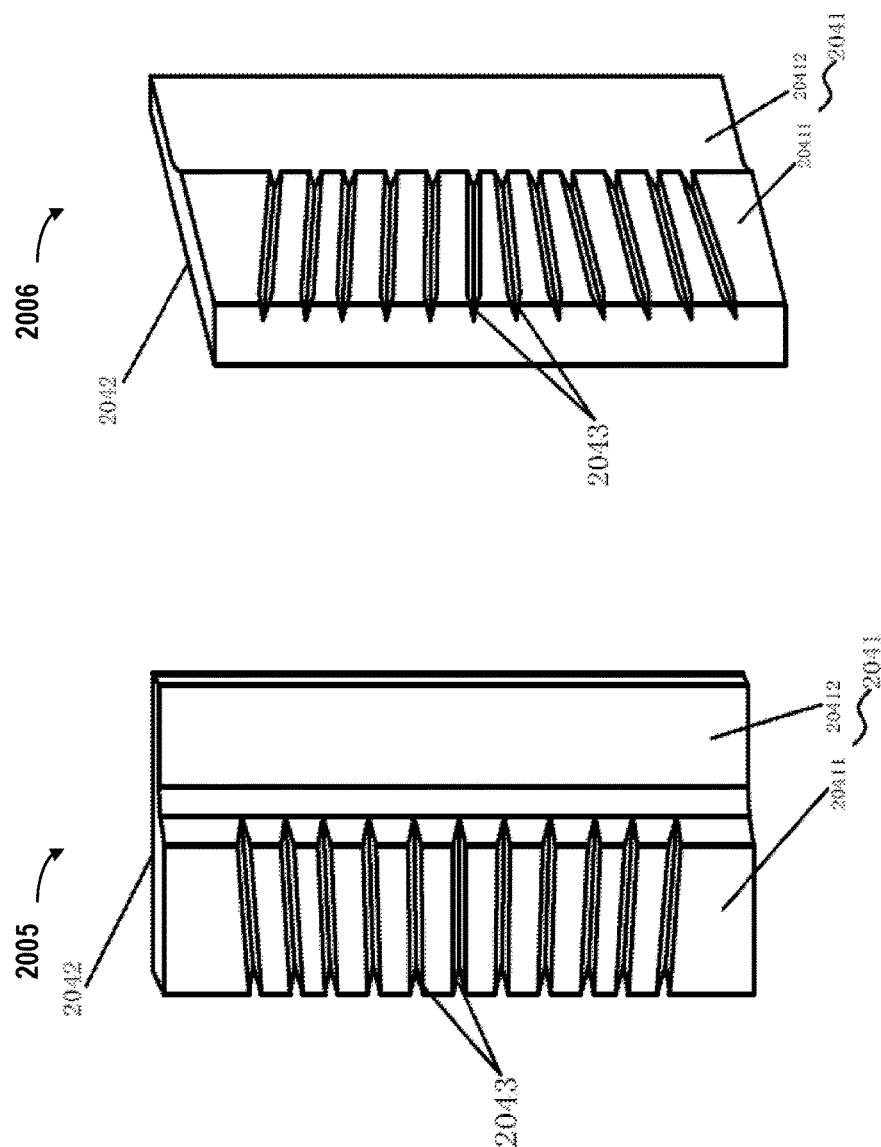

FIGS. 2-4 show exemplary slots 2043 with a cross-section in V shape, in accordance with some embodiments of the invention. In the illustrated mounting units 2001, 2002, 2003, 2004, the slot 2043 may have a V-shaped cross-section. The slot may have a width at the opening greater than the diameter of the optical fiber such that the optical fiber can be entirely fit inside or enclosed by the slot circumferentially. Alternatively, a circumferential portion of the optical fiber (e.g., half circle, ¼ circle) may be accommodated inside the slot. In some cases, attachment methods may be used to fix the optical fiber to the mounting unit. Any suitable attachment method may be utilized, including but not limited to, bonding with an adhesive or epoxy (e.g., using an ultraviolet-cure (UV-cure) adhesive, glue, a two-part epoxy, a thermally conductive epoxy, or an electrically conductive epoxy), welding, brazing, soldering, mechanical fastening (e.g., with one or more screws, flanges, interlocking connections, friction, snaps, locks, clips, rails), or any suitable combination thereof.

An array of slots 2043 may be formed on a first side 2041 of the mounting unit (e.g., mounting units 2004, 2005, 2006). Alternatively, arrays of slots may be formed on two or more sides of the mounting unit. For example, arrays of slots 2043 are formed on two opposing sides 2041, 2042 of the mounting unit (e.g., mounting units 2001, 2002, 2003), respectively. The two arrays of slots may or may not have the same layout (e.g., spacing or distribution may or may not be the same). The two arrays of slots formed on the two opposing sides may or may have the same cross-sectional shape. The two arrays of slots formed on the two opposing sides may be interleaved or aligned along the depth direction of the mounting unit. In the illustrated examples, an array of slots may be formed on one side 2041 of a mounting unit 2002, 2003, 2004, 2005, 2006 comprising a stepped surface 20411, 20412. In the examples, a depth of the slot may be the step-difference between the two surfaces 20411, 20412.

The aforementioned light sources may be spatially decoupled from the emission end of the emitting apparatus of the Lidar system or the distribution pattern of the output light beams. This may provide benefit to provide a Lidar system with improved performance by allowing for an optimized configuration of the light sources with less spatial restriction. For instance, the light sources may be organized or arranged to be in direct contact or in close proximity to a cooling device thereby improving the performance of the Lidar system. In addition to or alternatively, the light sources may be spaced part or separated with spacing permitting sufficient contact with air flow thereby aiding in heat exchange. In some cases, the removal of heat from the light sources may provide for lower device operating temperature, and thus may improve device reliability. Additionally, lower operating temperature of the device may result in lower electrical resistance values for the stator and rotor conducting materials of the Lidar system. This may effectively reduce resistive losses in the system, which may translate into improved system efficiency. Additionally, stabilization of the temperature of a laser diode may provide for the laser-diode operating wavelength to be substantially stable.

Any suitable cooling methods can be utilized by the Lidar system. The cooling method can be passive cooling such as by arranging the light sources to be thermally coupled to a heat sink or other cooling feature (e.g., heat pipe, heat spreader, etc). Passive cooling may refer to dissipation of heat from a light source (e.g., laser diode, laser driver) by thermal contact with a heat sink or cooling fins. In some cases, a device, such as a fan, may be used to blow a gas/air over the surface of the cooling fins and/or heat sinks to aid in passive cooling. The cooling method can be active cooling such as utilizing a thermoelectric cooler driven by temperature controller to adjust or stabilize the laser-diode operating temperature.

Figure 5:
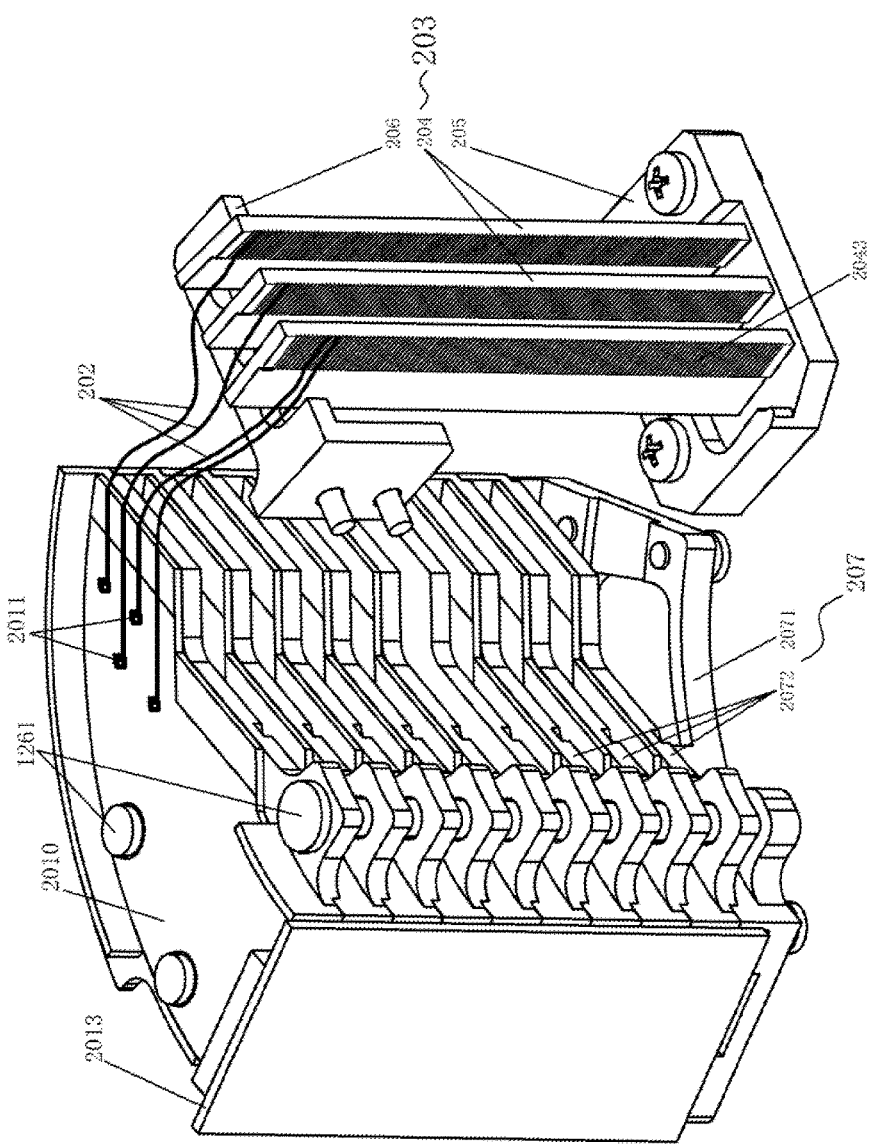
FIG. 5 shows an example of a plurality of light sources coupled to a plurality of optical fiber elements, where the optical fiber elements are coupled to a mounting apparatus, in accordance with some embodiments of the invention.
Figure 6:
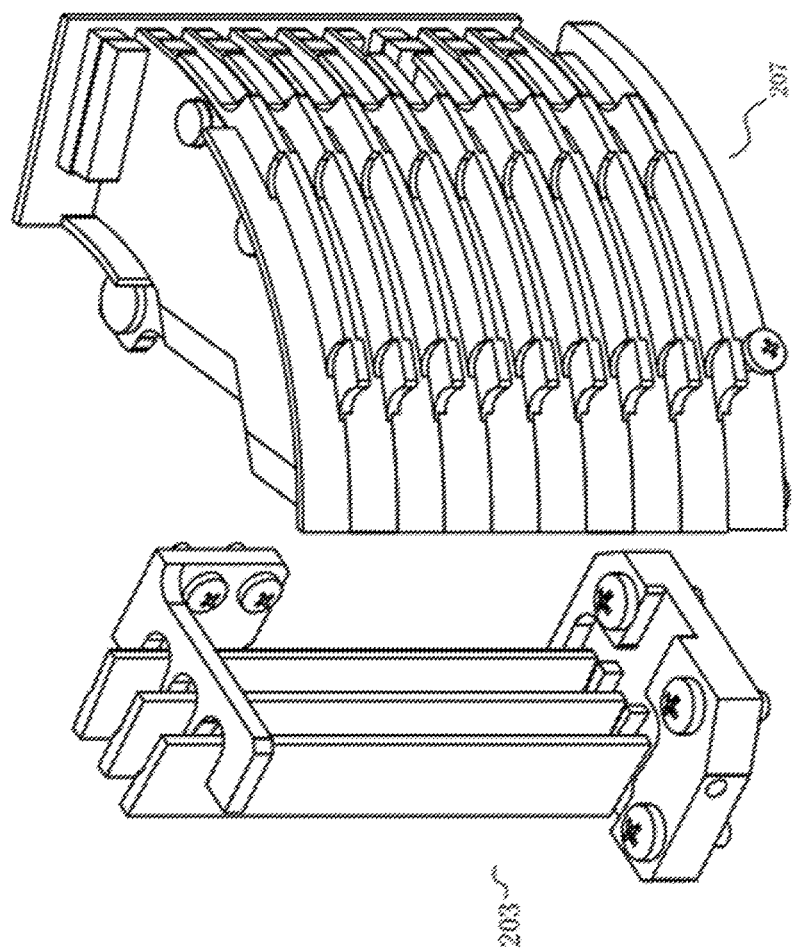
FIG. 6 is another perspective view without the light sources and the optical fiber elements.

FIG. 5 and FIG. 6 show an example of a plurality of light sources 2011 coupled to a plurality of optical fiber elements 202, where the optical fiber elements are coupled to a mounting apparatus 203, in accordance with some embodiments of the invention. The optical fiber elements 202 can be the same as the optical fiber elements as described elsewhere herein. The mounting apparatus 203 may comprise one or more mounting units 204. The mounting unit can be the same as the mounting unit as described above. For example, the mounting unit may comprise a set of slots 2043 having pre-determined directions to control the output direction of a plurality of light beams. The mounting unit may be fixed to a base structure 205, 206. Further details about the mounting apparatus are described later herein.

In some cases, the plurality of light sources 2011 and the front end of the mounting unit 204 may be separated by at least 5 mm, 1 cm, 2 cm, 3 cm, 4 cm, 5 cm, 10 cm, or more. The term "front end" as utilized herein may refer to the end of the mounting unit or the mounting apparatus where light beams emitting from. The front end of the mounting unit may also be the emitting end surface of the optical fiber elements or the emission end of the light beams (emitted from the optical fiber elements). The plurality of light sources may be located in any location relative to the emission end of the light beams.

The plurality of light sources 2011 are mounted to a mounting platform 207. The mounting platform 207 may comprise a cooling feature. In some embodiments, the cooling feature may include a plurality of heat sinks 2072.

In some cases, one or more lasers or light sources may be packaged into an emission board 2010 each being in direct contact with a heat sink 2072. In some cases, the emission board may have a case such that an external surface of the case may be in direct contact with the heat sink thereby removing excess heat generated by the electronic components (e.g., laser diode, laser driver) of the light source. Alternatively, the electronic components may not be enclosed by a case and the electronic components may be in direct contact with the heat sink. For instance, the semiconductor substrate of laser diode may be in direct contact with the heat sink. The heat sink and/or the case of the emission board may be made of thermal conductive material. For example, the heat sink 2072 may be made from a material with a thermal conductivity of greater than 5 W·m$^{-1}$·K$^{-1}$. The materials may include, but are not limited to, metals (such as copper, aluminum, brass, silver, gold, iron, steel, lead), diamond, carbon, or any alloy, mixture, or combinations thereof. Having a relatively high thermal conductivity may allow the heat sink to dissipate or remove heat produced by some of the electrical components mounted to the heat sink, for example, the laser diode, laser driver or other components.

Any number of heat sinks can be included in the Lidar system. For example, the plurality of light sources may be assigned to be located onto at least 2, 3, 4, 5, 6, 7, 8, 9, 10, 20 or more heat sinks. A heat sink may be in direct contact with 1, 2, 3, 4, 5, 6, 7, 8, 9, 10, 20 or more light sources. The plurality of heat sinks 2072 may be spaced apart for an improved heat dissipation performance. For instance, the two adjacent heat sinks 2072 may be separated by at least 2 mm, 3 mm, 4 mm, 5 mm, 6 mm, 7 mm, 8 mm, 9 mm, 10 mm or more in the vertical direction. In some cases, the spacing between two adjacent heat sinks 2072 (at least in the vertical direction) may be greater than the vertical spacing between lasers in a conventional Lidar system. The plurality of heat sinks may be distributed uniformly. Alternatively, the plurality of heat sinks may be distributed in any configuration regardless of the distribution of light beams at the emission end.

In some cases, each emission board 2010 may be in direct contact with a heat sink 2072. For instance, an emission board may be mounted on a heat sink to be in direct contact with a top surface of a heat sink. In addition to or alternatively, two emission boards can be in direct contact with two opposing sides (e.g., top side and bottom side) of a heat sink. A plurality of emission boards may be separated by the heat sinks or interspersed with a plurality of heat sinks. The emission boards may be spaced apart with a gap in between two adjacent emission boards in the vertical direction. For instance, two adjacent emission boards 2010 may be separated by at least 2 mm, 3 mm, 4 mm, 5 mm, 6 mm, 7 mm, 8 mm, 9 mm, 10 mm or more in the vertical direction. The gaps among the emission boards may enable gas or air to flow or pass by the surface of the emission boards that could enhance heat exchange. The arrangement of the emission boards or the plurality of light sources may be independent of the distribution and/or the output direction of the light beams.

The emission board 2010 may be fixedly connected to the heat sink. The emission board can be attached to the heat sink using any suitable attachment means, including but not limited to, bonding with an adhesive or epoxy (e.g., using an ultraviolet-cure (UV-cure) adhesive, glue, a two-part epoxy, a thermally conductive epoxy, or an electrically conductive epoxy), welding, brazing, soldering, mechanical fastening (e.g., with one or more screws, flanges, interlocking connections, friction, snaps, locks, clips, rails), or any suitable combination thereof. In the illustrated example, mechanical fasteners such as screws 1261 may be used to assemble the plurality of heat sinks 2071 and the emission boards.

The mounting platform 207 may be fixedly connected to a rotor of the Lidar system. For example, the mounting platform 207 may be mechanically connected to a supporting body of the Lidar system through the base structure 2071, where the supporting body is rotated by the rotor of the Lidar system. The supporting body may be integral to the rotor or part of the rotor. The supporting body may comprise a cavity housing an emission apparatus or at least a portion of the components of an emission apparatus (e.g., light sources, mounting apparatus, lens assembly, etc), and receiving apparatus or at least a portion of the components of a receiving apparatus (e.g., lens assembly, detector, etc). The mounting platform 207 may be configured for mounting other components of an emission apparatus of the Lidar system. For instance, controller or other electronic components 2013 may be affixed to the mounting unit. In some cases, components that may generate heat may also be attached to the mounting unit (e.g., being in direct contact with the heat sinks) to facilitate heat dissipation.

In some cases, additional cooling features such as a thermoelectric cooler driven by temperature controller may be used to adjust or stabilize the light source (e.g., laser-diode) operating temperature. Other cooling features such as blades features are described later herein with respect to some embodiments.

In some cases, the mounting platform 207 coupled to the light sources and the mounting apparatus 203 coupled to the emission end of the optical fiber elements are both mechanically or rigidly connected to a rotor of the Lidar system. The mounting platform 207 and the mounting apparatus 203 may be driven by the rotor to move about a rotational axis. The mounting platform 207 and the mounting apparatus may be stationary relative to each other. The mounting platform 207 and the mounting apparatus 203 may be connected to the rotor via any suitable intermediate components or structures such as a supporting body. Alternatively, the mounting platform 207 and the mounting apparatus 203 may be attached to different portions of the Lidar system. The mounting platform and the mounting apparatus may or may not have relative movement with respect to one another.

The Lidar system may comprise a mounting apparatus for controlling an output direction and/or distribution of light beams. The mounting apparatus may comprise one or more mounting units. The mounting unit can be the same as the mounting unit as described elsewhere herein. For example, the mounting unit may comprise a set of slots having pre-determined directions to control the output direction of light beams. The set of slots may be formed on one side of the mounting unit or two opposing sides of the mounting unit. The mounting apparatus may further comprise components such as a base structure and/or other fixing structure configured to position the mounting units into pre-determined orientations.

Figure 7:
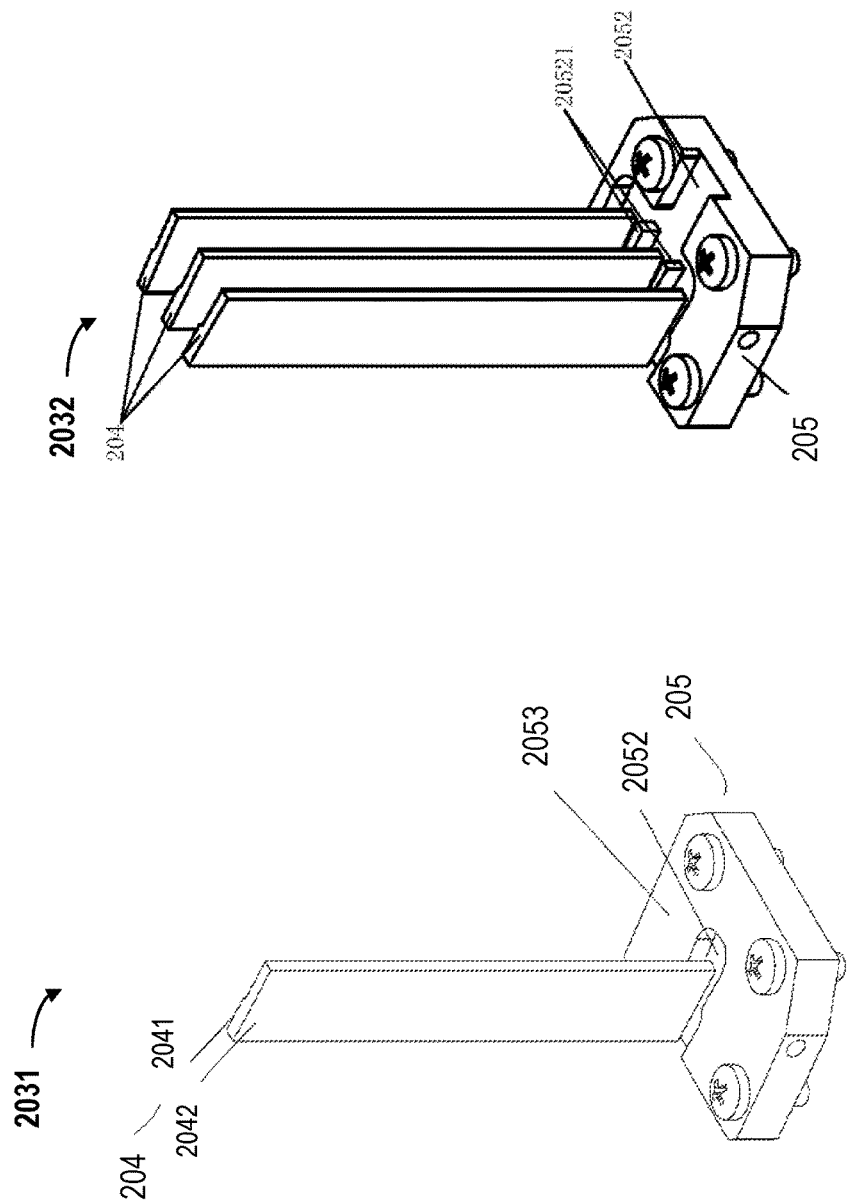
FIGS. 7-9 show various examples of a mounting apparatus, in accordance with some embodiments of the invention.
Figure 8:
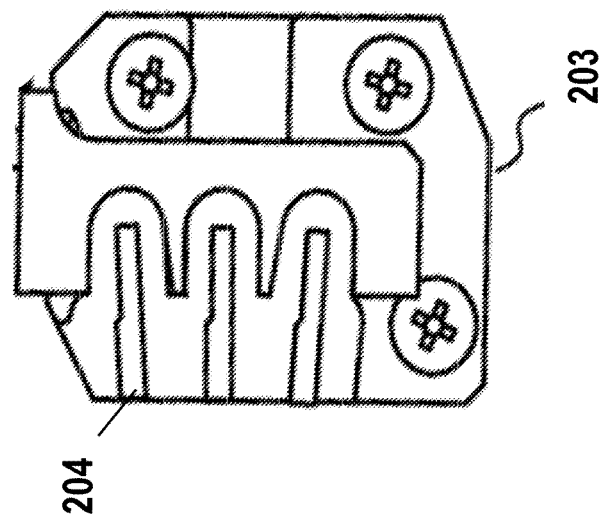
Figure 8:
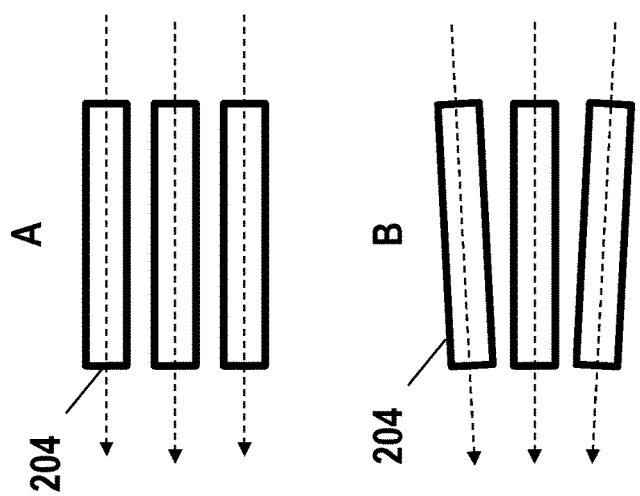
Figure 9:
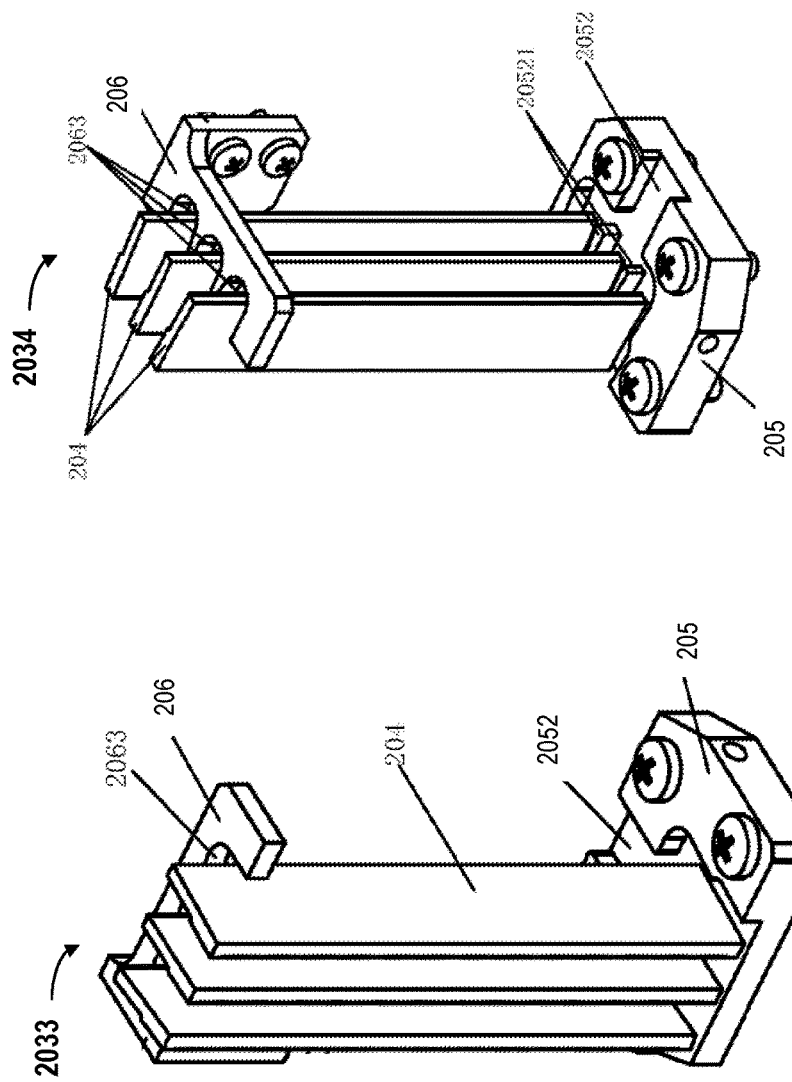

FIGS. 7-9 show examples of a mounting apparatus 2031, 2032, 2033, 2034, in accordance with some embodiments of the invention. In the illustrated example 2031, the mounting apparatus comprises one mounting unit 204 which is affixed to a base component 205. The mounting unit 204 may have two opposing sides 2041, 2042 and a set of slots can be formed on one side or both sides of the mounting unit. In some cases, the base component may comprise a docking structure 2052 formed on a surface 2053 of the base component. The mounting unit 204 may be received by or coupled to the base component 205 by the docking structure 2052. In the illustrated example 2031, the docking structure 2052 may be a groove or recessive structure having a shape and/or size that accommodates a dimension of the mounting unit. In another example 2032, the mounting apparatus may comprise multiple mounting units 204. The multiple mounting units 204 may be received by or coupled to the base component 205 by the docking structure 2052. The docking structure may have a shape and/or size to accommodate the multiple mounting units in a similar way as described above. Alternatively, the docking structure 2052 as illustrated in the example 2032 may include additional elements 20521 to separate the multiple mounting units 204 with pre-determined spacing and/or position the multiple mounting units into pre-determined orientations. The docking structure may be used to control an arrangement of multiple mounting units at least in a horizontal plane thereby affecting a distribution pattern and output direction of light beams. The horizontal plane is perpendicular to the vertical direction as described in FIG. 1.

In some cases, the docking structure may be used to configure the orientation of the mounting unit. An orientation of the mounting unit may be adjusted by adjusting the direction of the docking structure. This may advantageously allow for a flexible configuration of orientation of multiple mounting units with respect to one another thereby affecting a distribution pattern of the light beams. FIG. 8 shows a top view of a mounting apparatus 203 comprising multiple mounting units 204 with configurable orientations in a horizontal plane. The multiple mounting units 204 may be oriented with respective to one another such that a plurality of light beams emitted from one mounting unit may or may not be parallel to a plurality of light beams emitted from another mounting unit. For instance, in scenario A, the multiple mounting units 204 may be orientated to be parallel to each other (i.e., a forward direction of the mounting unit is aligned to each other) such that the plurality of light beams emitted from the mounting apparatus may be parallel in the horizontal plane. In the example of scenario B, the multiple mounting units 204 may be oriented to have a substantially converge arrangement in the horizontal plane such that the plurality of light beams emitted from the mounting apparatus may be substantially converged in the horizontal plane. Various other layouts (e.g., diverge arrangement) of the mounting units may be achieved by adjusting the shape and direction of the docking structure.

FIG. 9 shows other examples of mounting apparatus 2033, 2034. The mounting apparatus 2033, 2034 may include additional component such as fixation component 206 to assist positioning the mounting units 204. The fixation component 206 may be configured to hold the mounting units in place and/or into pre-determined orientations with respect to one another. In the example 2034, the fixation component 206 may have a docking structure 2063 shaped and/or sized to receive the mounting units 204 thereby controlling the orientation of the mounting units in the horizontal plane. The fixation component 206 may work in conjunction with the base component 205. The orientation of the mounting units may be controlled by the fixation component 206, the base component 205 or a combination of both. In another example, the fixation component 206 of the mounting unit 2033 may have a structure 2063 that may not restrict the orientation of the mounting units in the horizontal plane whereas the orientation may be controlled by the base component 205 alone (e.g., docking structure 2052).

Lidar system of the present disclosure may comprise an emitting apparatus with configurable light beam distribution, output direction, resolution as well as improved heat dissipation performance. In some embodiments, the output direction of light beams or distribution of light beams emitted from the output end of the optical fibers may be controlled by at least one of the following: selection of a subset of slots from a plurality of slots on each mounting unit, selection of one or more mounting units from multiple mounting units, and an orientation of multiple mounting units in the horizontal plane.

Figure 10:
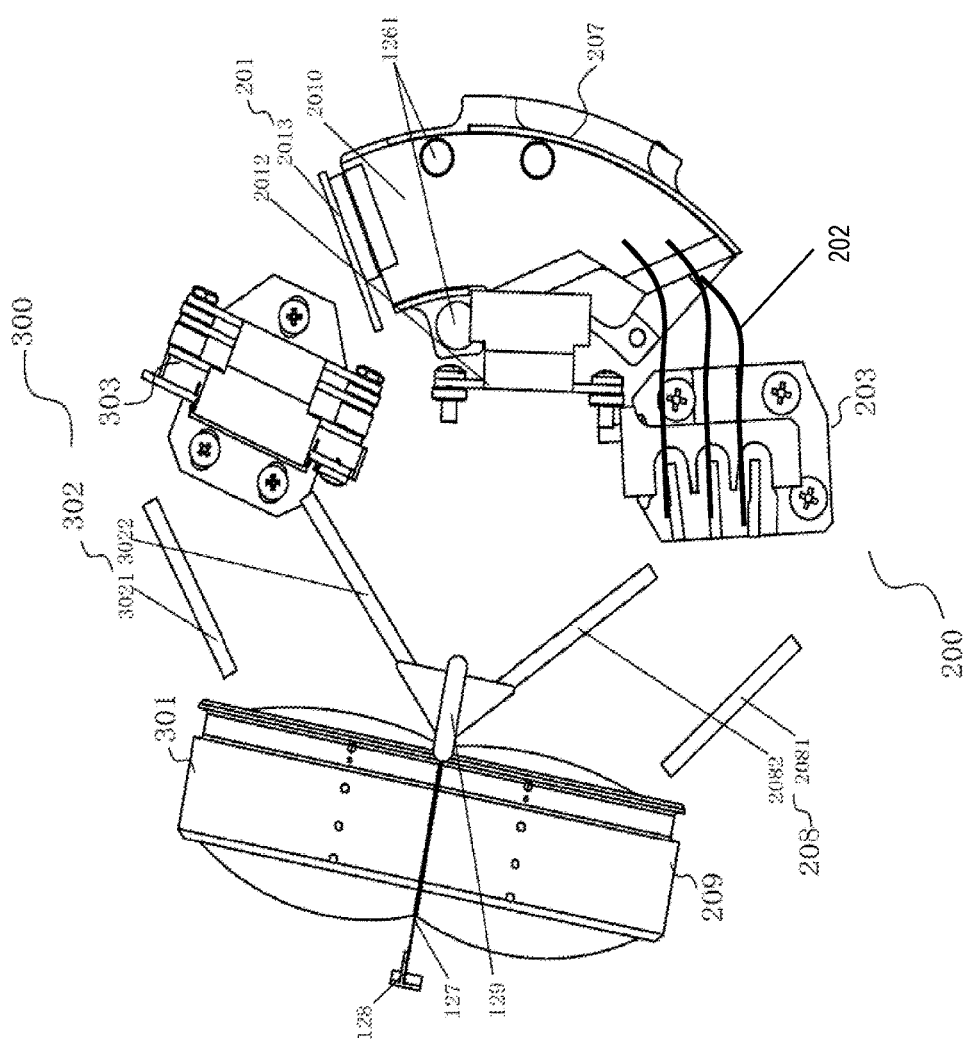
FIG. 10 shows an example of Lidar system comprising an emitting apparatus and a receiving apparatus.
Figure 11:
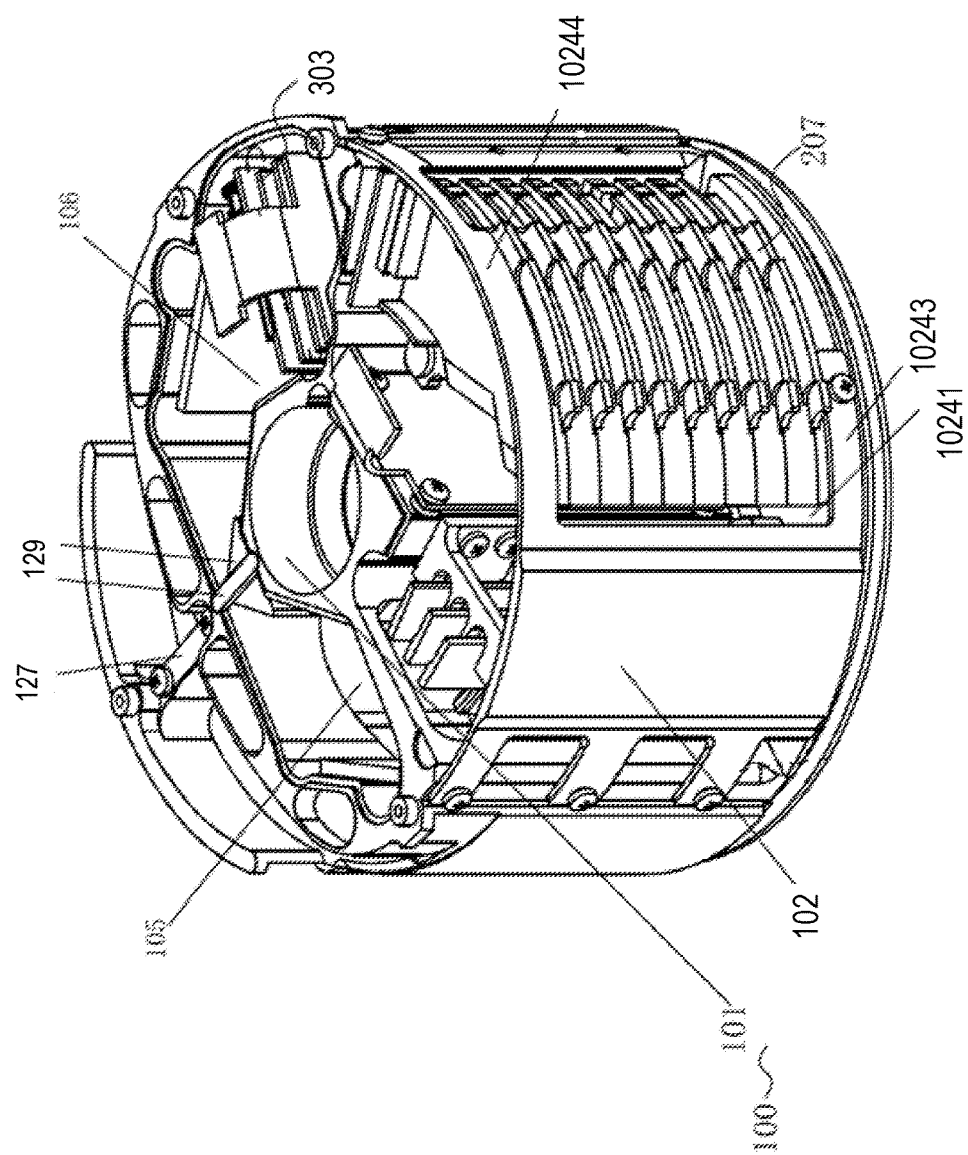
FIG. 11 shows an internal of an exemplary Lidar system, in accordance with some embodiments of the invention.

FIG. 10 and FIG. 11 illustrate an example of Lidar system comprising an emitting apparatus 200 and a receiving apparatus 300. The emitting apparatus may comprise a plurality of light sources 201 (e.g., emission boards 2010, driving circuits and other electronic components 2012, 2013) mounted to a first mounting apparatus or a mounting platform 207. The mounting platform 207 may comprise cooling features. In some cases, the mounting platform 207 may comprise thermal conductive material or materials with high thermal conductivity and the electronic components may be in direct contact with the mounting platform 207 for heat dissipation purpose. Other cooling features of the mounting unit can be included as described elsewhere herein.

The plurality of light sources may be coupled to an input end of a plurality of optical fiber elements 202. The optical fiber elements may be coupled to a mounting apparatus at an output end or emission end. The output direction and/or distribution pattern of a plurality of light beams may be controlled by the mounting apparatus 203 as described elsewhere herein. The output light beams may be directed to one or more optical elements 208 (e.g., reflectors 2081, 2082) and/or pass through a lens assembly 209 (e.g., collimation lens, collimation lens assembly) for collimating or focusing light beams. In some cases, one or more of the optical elements such as the reflector 2081, 2082 may be eliminated. In such cases, the output light beams may be directed to the lens assembly 209 directly.

In some embodiments, the Lidar system may comprise a receiving apparatus 300. The receiving apparatus and the emitting apparatus 200 may be located in separate cavities. In some cases, the receiving apparatus and the emitting apparatus may be housed by a supporting body (e.g., part of rotor) and separated by one or more components 127, 128, 129. In some embodiments, the receiving apparatus may comprise a plurality of detectors configured to receive the echo beams. Each of the detectors may correspond to one of the lasers and may be configured to receive light originated from the corresponding laser. The receiving apparatus may also be referred to as a receiver which includes a detector (e.g., photoreceiver, optical receiver, optical sensor, photodetector, or optical detector). In some cases, a receiver may include one or more avalanche photodiodes (APDs) or one or more single-photon avalanche diodes (SPADs). In some cases, a receiver may include one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions).

In some embodiments, the receiving apparatus 300 may comprise an optical receiving device 301 (e.g., focusing lens, focusing lens assembly), one or more optical elements 302 (e.g., reflectors 3021, 3022), and a plurality of detectors 303. The reflected light off an external object may pass through the optical receiving device 301 and then is received by the detectors 303. The quantity of the detectors may be the same as that of the lasers or light sources. The quantity of the detectors may be the same as that of the optical fiber elements.

In some embodiments, use of flexible optical fibers to couple the light sources and the emission end of the emitting apparatus may allow for an optimized overall design of the Lidar system. For example, the plurality of light sources may be mounted to a mounting platform with an optimal arrangement or layout to facilitate heat dissipation. FIG. 11 shows an internal view of an exemplary Lidar system, in accordance with some embodiments of the invention.

In some embodiments, components of the emitting apparatus and components of the receiving apparatus may be coupled to the rotor 100 of the Lidar system. In some cases, the emitting apparatus and/or the receiving apparatus may be affixed to the rotor and rotated by the rotor. The rotor 100 may comprise a supporting body having a cavity formed by an inner surface 101 and an outer surface 102. The cavity may comprise a receiving cavity 106 and an emitting cavity 105 separated by one or more components (e.g., components 127, 129). The receiving cavity 106 may be configured to house the receiving apparatus or one or more components of the receiving apparatus (e.g., lens, reflectors, and detectors 303). The emitting cavity 105 may be configured to house the emitting apparatus or one or more components of the emitting apparatus (e.g., light sources, mounting platform 207 for the light sources, mounting apparatus for the emission end, lens assembly, etc).

In some cases, the mounting platform 207 may be attached to the supporting body. In the illustrated example, the outer surface 102 of the supporting body may comprise structures (e.g., structure 10241, 10243, 10244) to accommodate a portion of the mounting platform to facilitate heat dissipation. For example, at least a circumferential portion (e.g., blade feature) of the mounting platform may be exposed or extended outside of the outer surface such that air flow may be enhanced by the blade features when the mounting platform and supporting body are turned/rotated by the rotor. Additionally, the exposed portion or the surface extended outside of the outer surface may also promote heat exchange.

Figure 12:
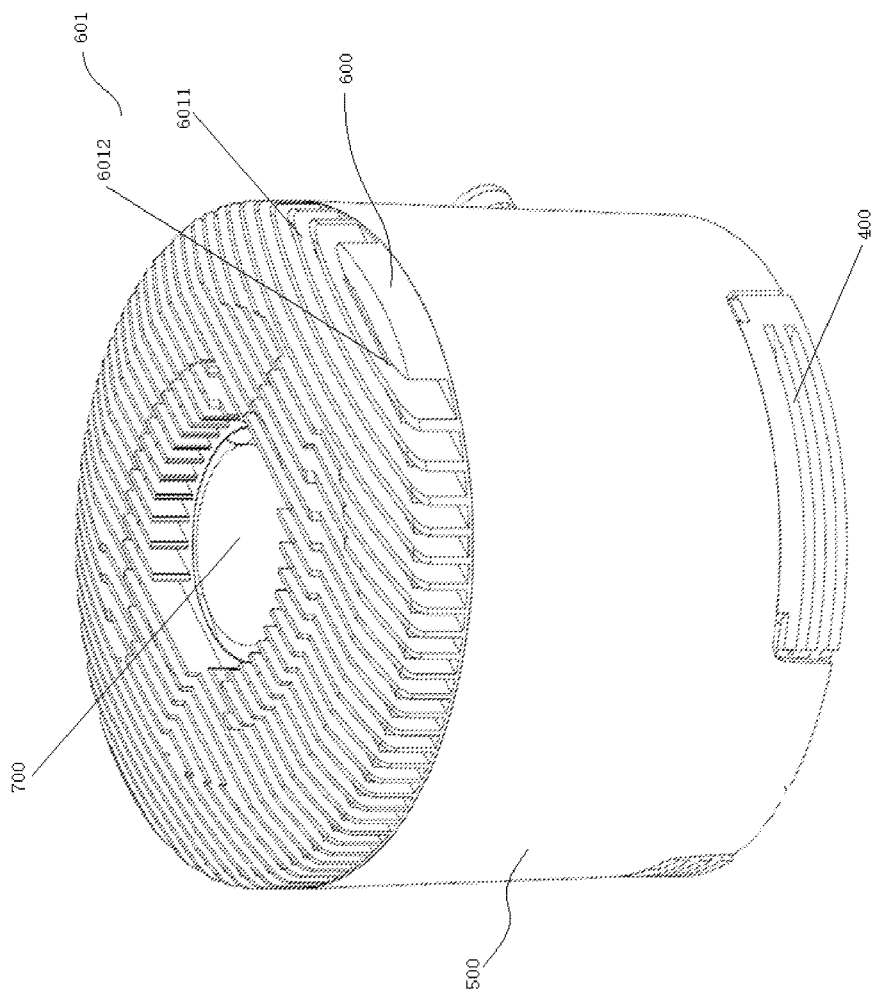
FIG. 12 illustrates an outside of an exemplary Lidar system, in accordance with some embodiments of the invention.
Figure 15:
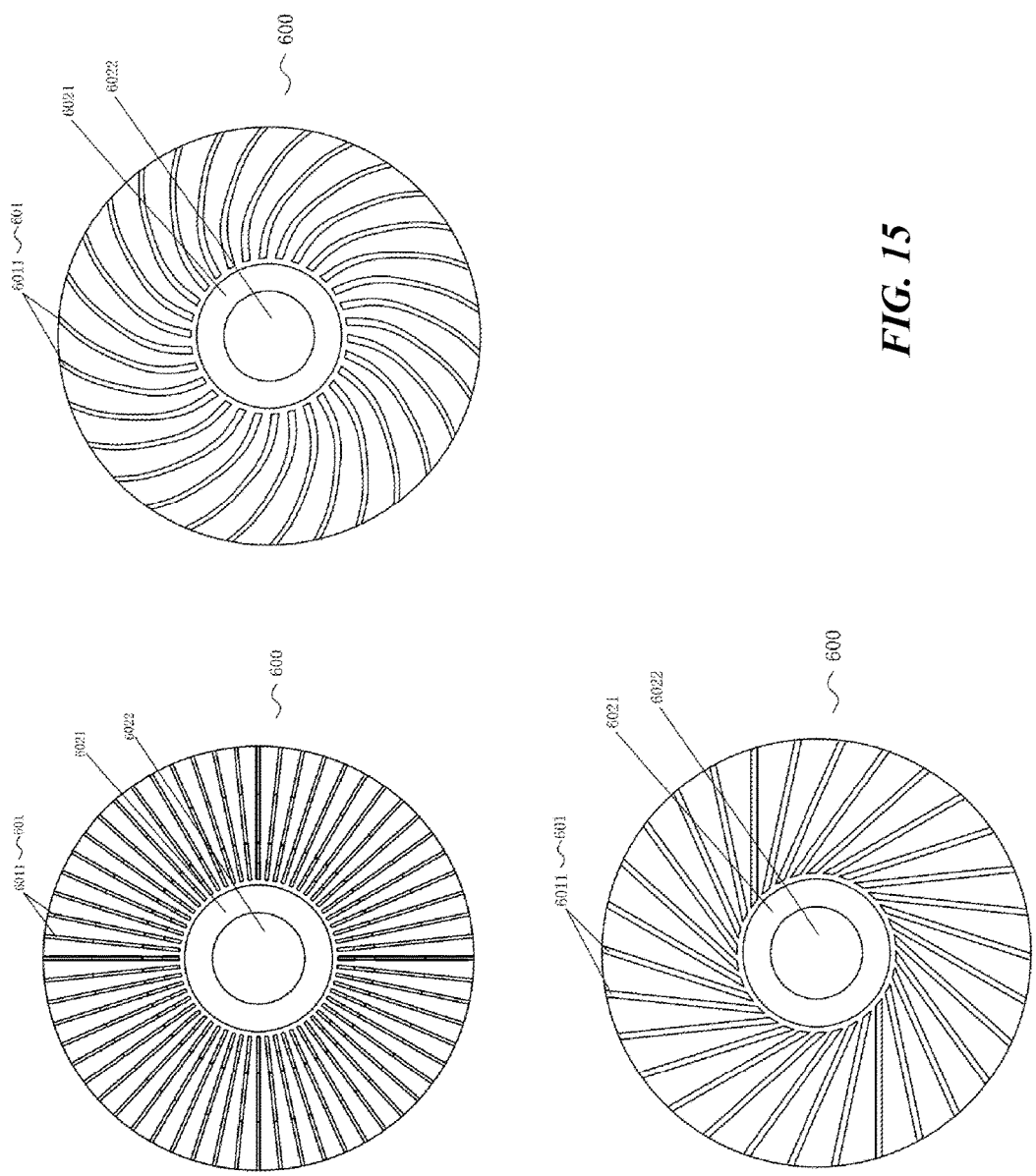
FIG. 15 shows top views of various other examples of heat dissipation features.

In some cases, Lidar system may be sealed such that the air may be circulated inside the Lidar system driven by the cooling feature of the mounting platform. FIG. 12 illustrates an outside view of an exemplary Lidar system, in accordance with some embodiments of the invention. In some cases, the rotor may be enclosed within a housing of the Lidar system. In an embodiment, the housing may comprise a cap 700, a top 600, wall body 500 and a base 400 to seal the Lidar system. In some cases, the top 600 may comprise heat dissipation features 601 to help remove excess heat generated by the components inside the Lidar system. In some cases, the heat dissipation features may comprise a plurality of fins 6011, 6012 to aid in heat exchange with the ambient environment. In some cases, air circulation inside the housing may be promoted by cooling features of the mounting platform (e.g., blade feature) as described above. The plurality of fins can be in any suitable arrangement and may have any suitable form factors. FIG. 15 shows top views of various other examples of heat dissipation features 601. The top 600 may comprise a plurality of fins 6011 that may be substantially a slab or a curved structure. The top 600 may comprise a structure 6021, 6022 to accommodate the cap 700 in order to seal the Lidar system.

Figure 13:
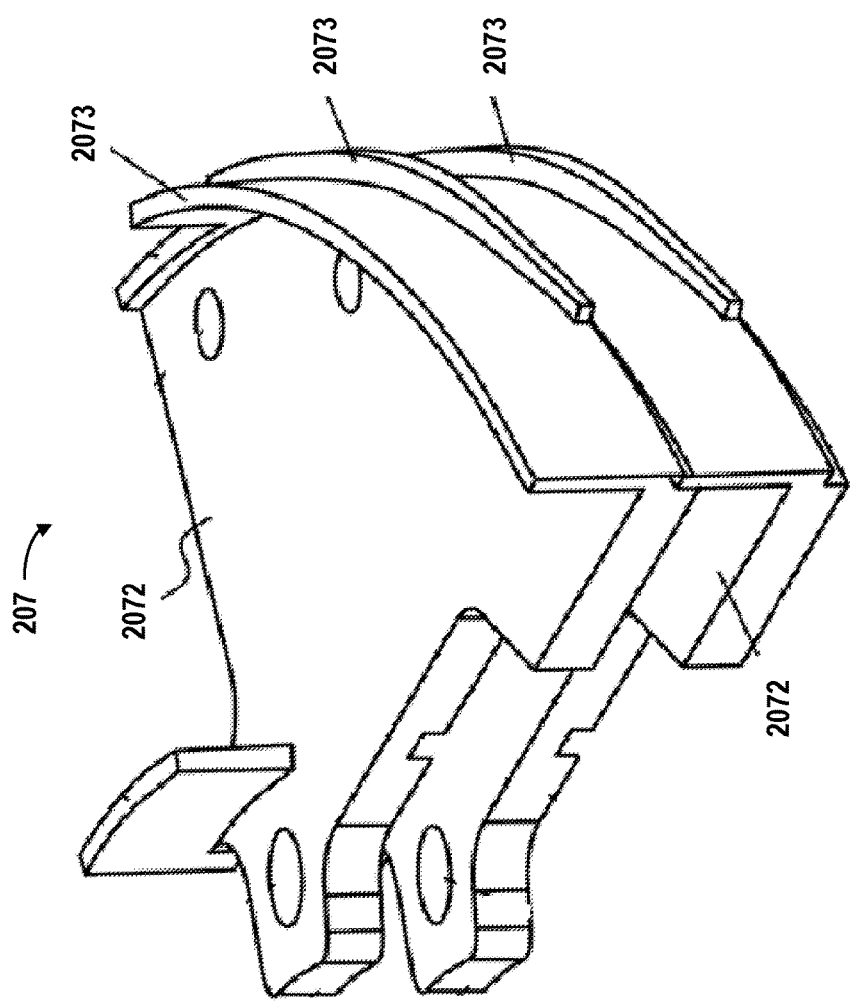
FIG. 13-14 show examples of blade features.
Figure 14:
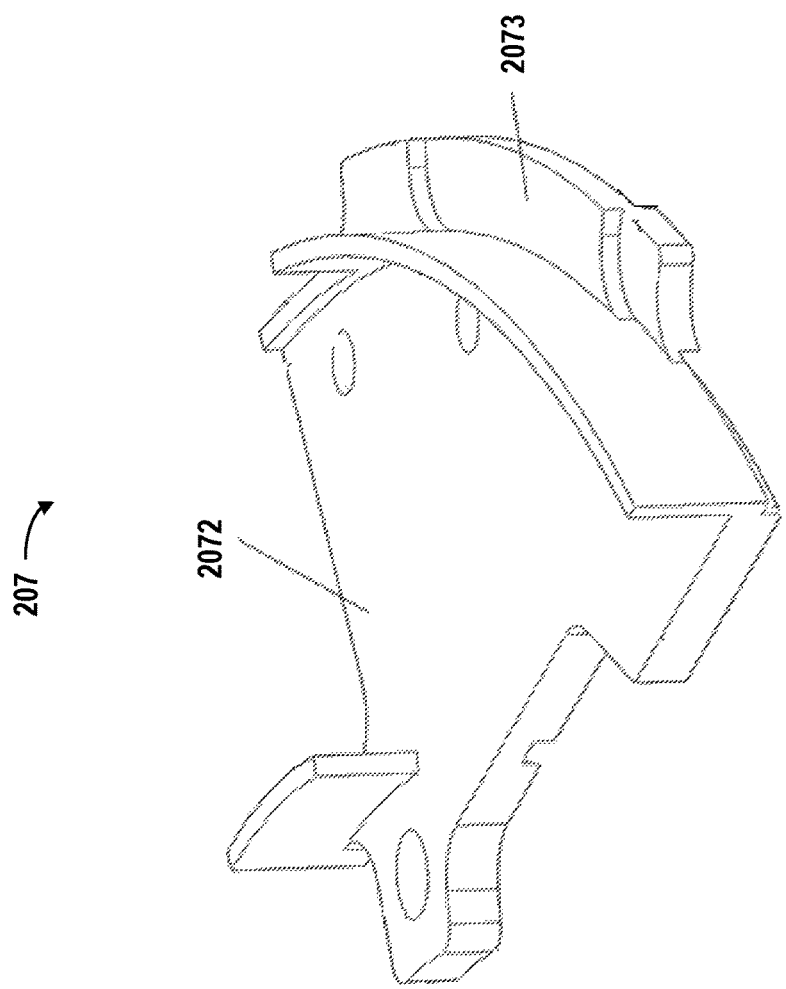

FIG. 13 and FIG. 14 show examples of cooling features of the mounting platform 207. The cooling feature may comprise heat sinks 2072 and blade features 2073 as shown in FIG. 13. In the illustrated example, a plurality of blade features 2073 extending from the heat sinks 2072 may be used to facilitate heat dissipation. In some embodiments, the blade features may be shaped and sized to function as rotating blades to promote air flow. For example as shown in FIG. 13, the mounting platform 207 is fixedly connected to a rotor of the Lidar system, and the blade features 2073 may rotate about the rotational axis of the Lidar system thereby forcing air to flow or circulate in the Lidar system. The blade features 2073 can be of any suitable form or shape to promote air flow in the chamber of the Lidar system. For instance, the blade features 2073 as shown in FIG. 13 may be designed to have a blade angle to increase air flow. FIG. 14 shows another example of blade feature 2073. In the illustrated example, the blade feature 2073 may have stepped surface to increase external surface area so as to exchange heat and increase air flow inside the Lidar system. The blade feature may be integrally formed with the heat sink. Alternatively or in addition to, the blade feature may be a separate component and be assembled to the heat sink.

Figure 16:
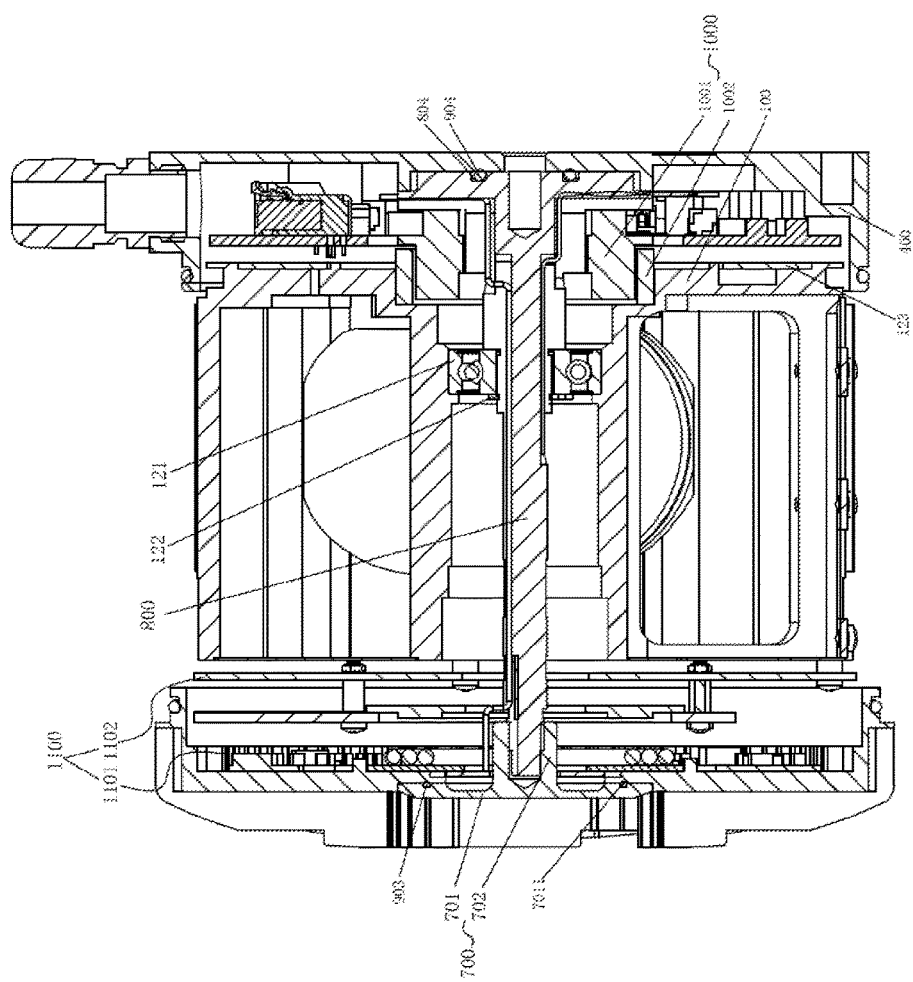
FIG. 16 shows an example of a Lidar system comprising a wireless power transmission module.

In some embodiments, the Lidar system may comprise a wireless power transmission module. The wireless power transmission module may provide electrical power to various electronic components of the Lidar system. The wireless power transmission module may be configured to transmit electrical power to the Lidar systems using inductive transmission. The wireless power transmission module may comprise a primary coil. The primary coil can be integrated into a transmission part of the wireless power transmission module to transmit inductive energy to a secondary coil which is integrated into the receiving part of the wireless power transmission module. The secondary coil can be used to charge one or more energy sources (e.g., energy source/battery of the lasers) of the Lidar system. The two coils may be in a substantially parallel orientation or other orientation sufficient for inductive transmission during a charging process. Electric power can be transferred over short distances by magnetic fields using inductive coupling between coils of wire. FIG. 16 shows an example of a Lidar system comprising a wireless power transmission module 1100. In the illustrated example, the wireless power transmission module may include: a transmitting part 1101, a receiving part 1102. The receiving part 1102 and the transmitting part 1101 may be parallel with each other spaced apart by a short distance. In some cases, the transmitting part 1101 may be coupled to the top 600 as described above and the receiving part 1101 may be coupled to the rotor 100. The receiving part 1102 may be fixedly connected to the rotor, and rotated about the central shaft 800. The central shaft 800 may be connected to the cap 700 via structures 701, 702. The cap 700 may comprise structures 7011 and sealing elements 903 such as O-rings for sealing the Lidar system. The central shaft 800 may also comprise sealing structure 804. The central shaft 800 may be connected to the base 400. The sealing structure 804 and sealing elements 904 such as O-rings may be used for sealing the Lidar system from the bottom end. The central shaft 800 may be supported by bearings 121. The bearings 121 may be connected to the central shaft 800 via intermediary elements 122. The Lidar system may comprise a rotary encoder 123. The rotary encoder 123 may be disposed on the bottom end of the rotation cavity and is used to measure the angular position/velocity of the rotor 100 which is connected to the rotor 1002 of the motor module 1000.

Figure 17:
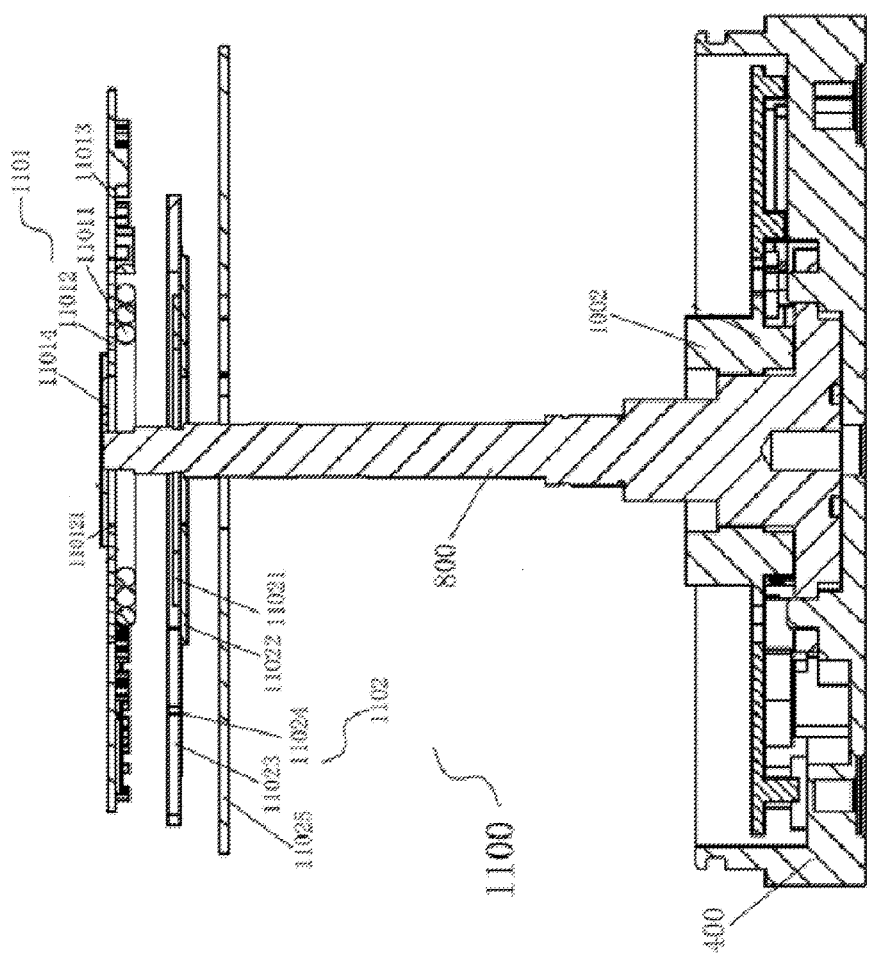
FIG. 17 shows a side view of the wireless power transmission module.

FIG. 17 shows a side view of the wireless power transmission module 1100. The power transmission module 1100 can be the same as the power transmission module as described in FIG. 16. The transmitting part 1101 may comprise a primary coil 11011, a first electromagnetic field shielding element 11012 and a circuit board 11013. The receiving part 1102 may comprise a secondary coil 11021, a second electromagnetic field shielding element 11022 and a circuit board 11023. The electromagnetic field shielding elements 11012, 11022 may be configured to isolate electromagnetic field of the wireless power transmission module from other electrical elements in the Lidar system. The electromagnetic field shielding elements may comprise any suitable structures 110121, 110221 and may have any suitable shape (e.g., ring, circular, etc). The wireless power transmission module 1100 can include any other electromagnetic field shielding element 11024 located in any suitable locations to shield the electrical components of the Lidar system from the electromagnetic field generated by the wireless power transmission module. In some cases, the wireless power transmission module may further comprise a circuit board 11014 in direct contact with the electromagnetic field shielding element 11012. The circuit board 11014 may in electrical communication with the circuit board 11013 and in connected to the cap (now shown). The wireless power transmission module may further comprise a circuit board 11014 in electrical communication with circuit board 11023. The central shaft 800 may be rigidly connected to a stator 1001 of the motor 1000.

The provided Lidar system may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a 360 degree horizontal field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" is used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure or the reference frame. Similarly, if the element in one of the figures were turned over, elements described as "below" or "beneath" other elements would then be oriented "above" the other elements. The exemplary terms "below" or "beneath" can, therefore, encompass both an orientation of above and below.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A Lidar system comprising:
a plurality of light sources configured to emit a plurality of light beams, wherein the plurality of light sources are mounted to a first mounting apparatus comprising a cooling feature;
a plurality of optical fiber elements, wherein each of the plurality of light sources is optically coupled to an input end of one or more optical fiber elements from the plurality of optical fiber elements; and
a second mounting apparatus comprising at least one mounting unit coupled to an emitting end of the plurality of optical fiber elements, wherein the at least one mounting unit is configured to control an output direction of the plurality of light beams individually, and a distribution pattern of the plurality of light beams emitted from the emitting end of the plurality of optical fiber elements, and wherein the at least one mounting unit comprises a set of slots arranged along a length direction of the mounting unit.

2. The Lidar system of claim 1, wherein the plurality of light sources, the plurality of optical fiber elements, the first mounting apparatus and the second mounting apparatus are configured to rotate about a vertical axis.

3. The Lidar system of claim 1, wherein the plurality of light sources, the plurality of optical fiber elements or the second mounting apparatus is disposed on a supporting body connected to a rotor of the Lidar system.

4. The Lidar system of claim 1, wherein the first mounting apparatus comprises a material with high thermal conductivity.

5. The Lidar system of claim 1, wherein the cooling feature includes at least one heat sink in direct contact with the plurality of light sources.

6. The Lidar system of claim 1, wherein the cooling feature includes a plurality of blade features to facilitate air circulation inside the Lidar system.

7. The Lidar system of claim 1, wherein an arrangement of the plurality of light sources mounted to the first mounting apparatus provides spacing among the plurality of light sources so as to facilitate heat dissipation.

8. The Lidar system of claim 7, wherein the distribution pattern of the plurality of light beams emitted from the emitting end of the plurality of optical fiber elements is independent of the arrangement of the plurality of light sources.

9. The Lidar system of claim 1, wherein each of the plurality of light sources is optically coupled to one or more optical fiber elements using an optical coupling element.

10. The Lidar system of claim 1, wherein at least one of the plurality of light sources is optically coupled to two or more optical fiber elements using an optical coupling element.

11. The Lidar system of claim 10, wherein the two or more optical fiber elements have different optical properties.

12. The Lidar system of claim 1, wherein the at least one mounting unit is mechanically connected to a rotor of the Lidar system with a pre-determined orientation.

13. The Lidar system of claim 1, wherein the second mounting apparatus comprises multiple mounting units arranged in a horizontal plane with pre-determined orientations, and wherein each mounting unit comprises a set of slots arranged along a length direction of the mounting unit.

14. The Lidar system of claim 1, wherein the set of slots are located on two opposing sides of the at least one mounting unit.

15. The Lidar system of claim 1, wherein a subset of slots is selected from the set of slots for receiving the plurality of optical fiber elements by the emitting end.

16. The Lidar system of claim 1, wherein each of the set of slots has a pre-determined tilt angle with respect to a horizontal direction.

17. The Lidar system of claim 15, wherein the output direction of the plurality of light beams is individually controlled by selecting a given slot with a pre-determined tilt angle from the set of slots.

18. The Lidar system of claim 1, wherein the set of slots are non-uniformly along the length direction of the mounting unit.

19. The Lidar system of claim 13, wherein the distribution pattern of the plurality of light beams emitted from the emitting end of the plurality of optical fiber elements is controlled by a selection of a subset of slots from the set of slots and/or a selection of one or more mounting units from the multiple mounting units.

20. The Lidar system of claim 1, wherein the plurality of light beams emitted from the emitting end of the plurality of optical fiber elements are directed to an optical element to collimate the plurality of light beams into collimated light beams to propagate in different directions.

21. The Lidar system of claim 1, further comprising a receiving device to receive echo light beams and wherein the receiving device is disposed on a rotor of the Lidar system.

22. The Lidar system of claim 1, further comprising a wireless transmission module configured to provide electrical energy to the Lidar system.

* * * * *

UNITED STATES PATENT AND TRADEMARK OFFICE
CERTIFICATE OF CORRECTION

PATENT NO. : 10,295,656 B1
APPLICATION NO. : 16/170783
DATED : May 21, 2019
INVENTOR(S) : Jiasheng Li et al.

It is certified that error appears in the above-identified patent and that said Letters Patent is hereby corrected as shown below:

On the Title Page

Item (30) Foreign Application Priority Data:
Add:
--June 8, 2018 (CN) 201810583805.1
June 8, 2018 (CN) 201810583863.4
June 8, 2018 (CN) 201820881299.X--

Signed and Sealed this
Twenty-fourth Day of September, 2019

Andrei Iancu
*Director of the United States Patent and Trademark Office*